US011853938B1

(12) United States Patent
Muthusamy et al.

(10) Patent No.: US 11,853,938 B1
(45) Date of Patent: Dec. 26, 2023

(54) SYSTEM AND METHOD OF REINFORCED MACHINE-LEARNING RETAIL ALLOCATION

(71) Applicant: Blue Yonder Group, Inc., Scottsdale, AZ (US)

(72) Inventors: Ganesh Muthusamy, Hyderabad (IN); Sudhakar Jayapal, Hyderabad (IN); Karthik Kondapaneni, Hyderabad (IN); Rajneesh Kumar Agrawal, Bangalore (IN)

(73) Assignee: Blue Yonder Group, Inc., Scottsdale, AZ (US)

( * ) Notice: Subject to any disclaimer, the term of this patent is extended or adjusted under 35 U.S.C. 154(b) by 0 days.

(21) Appl. No.: 17/119,591

(22) Filed: Dec. 11, 2020

Related U.S. Application Data

(60) Provisional application No. 62/947,971, filed on Dec. 13, 2019.

(51) Int. Cl.
| | |
|---|---|
| *G06Q 10/0631* | (2023.01) |
| *G06N 20/00* | (2019.01) |
| *G06Q 50/28* | (2012.01) |
| *G06Q 10/067* | (2023.01) |
| *G06Q 30/0202* | (2023.01) |
| *G06N 5/04* | (2023.01) |

(52) U.S. Cl.
CPC ......... *G06Q 10/06313* (2013.01); *G06N 5/04* (2013.01); *G06N 20/00* (2019.01); *G06Q 10/067* (2013.01); *G06Q 30/0202* (2013.01); *G06Q 50/28* (2013.01)

(58) Field of Classification Search
CPC ....... G06Q 10/06375; G06Q 10/06313; G06Q 50/02; G06Q 10/067; G06Q 30/0202; G06Q 50/28; G06N 20/00; G06N 5/04
USPC ............................................... 705/7.37, 7.23
See application file for complete search history.

(56) References Cited

U.S. PATENT DOCUMENTS

| 7,092,929 B1 * | 8/2006 | Dvorak ................ G06Q 10/087 705/28 |
| 2017/0185933 A1 * | 6/2017 | Adulyasak ........... G06Q 10/087 |

(Continued)

OTHER PUBLICATIONS

Sui, et al., A Reinforcement Learning Approach for Inventory Replenishment in Vendor—Managed Inventory Systems With Consignment Inventory, 22 Engineering Management Journal 4 (2010) (Year: 2010).*

(Continued)

*Primary Examiner* — Charles Guiliano
(74) *Attorney, Agent, or Firm* — Spencer Fane LLP; Steven J. Laureanti

(57) ABSTRACT

A system and method for allocation planning comprise a server comprising a processor and memory and configured to calculate a reward for a historical allocation of a product to one or more stores associated with a retailer. Embodiments include simulating what-if scenarios for the historical allocation to identify an allocation having a greater reward than the historical allocation and allocating a quantity of a product for a current allocation to the one or more stores based, at least in part, on a distance calculation of one or more independent variables for the historical allocation and the current allocation and the identified allocation having the greater reward then the historical allocation.

17 Claims, 8 Drawing Sheets

(56) References Cited

U.S. PATENT DOCUMENTS

2018/0075401 A1\* 3/2018 Harsha ............... G06Q 30/0202
2020/0126015 A1\* 4/2020 Anandan Kartha ........................
　　　　　　　　　　　　　　　　　　　　　　　G06Q 10/06315

OTHER PUBLICATIONS

Zheng Sui et al., "A Reinforcement Learning Approach for Inventory Replenishment in Vendor-Managed Inventory Systems With Consignment Inventory," Engineering Management Journal, Dec. 2010, vol. 22 No. 4 pp. 44-53.

\* cited by examiner

SYSTEM AND METHOD OF REINFORCED MACHINE-LEARNING RETAIL ALLOCATION

CROSS-REFERENCE TO RELATED APPLICATIONS

The present disclosure is related to that disclosed in the U.S. Provisional Application No. 62/947,971, filed Dec. 13, 2019, entitled "System and Method of Reinforced Machine-Learning Retail Allocation." U.S. Provisional Application No. 62/947,971 is assigned to the assignee of the present application. The subject matter disclosed in U.S. Provisional Application No. 62/947,971 is hereby incorporated by reference into the present disclosure as if fully set forth herein. The present invention hereby claims priority under 35 U.S.C. § 119(e) to U.S. Provisional Application No. 62/947,971.

TECHNICAL FIELD

The present disclosure relates generally to allocation planning and specifically to systems and methods of reinforced machine learning training and prediction of constrained and unconstrained allocation quantities.

BACKGROUND

Unlike regular and core products, supply chain planners have fewer tools for accurately forecasting and managing short life-cycle products. Allocation of these short life-cycle products to the right store in the right quantity is a particularly difficult challenge because modeling and solving for the effects of the various influencing factors is too complicated to accomplish for each short life-cycle product within the planning period. Instead, the short life-cycle products are allocated based on sub-optimal generalized business rules, which results in lost sales and mark downs. The sub-optimal allocation of short life-cycle products is undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

DETAILED DESCRIPTION

Figure 1:
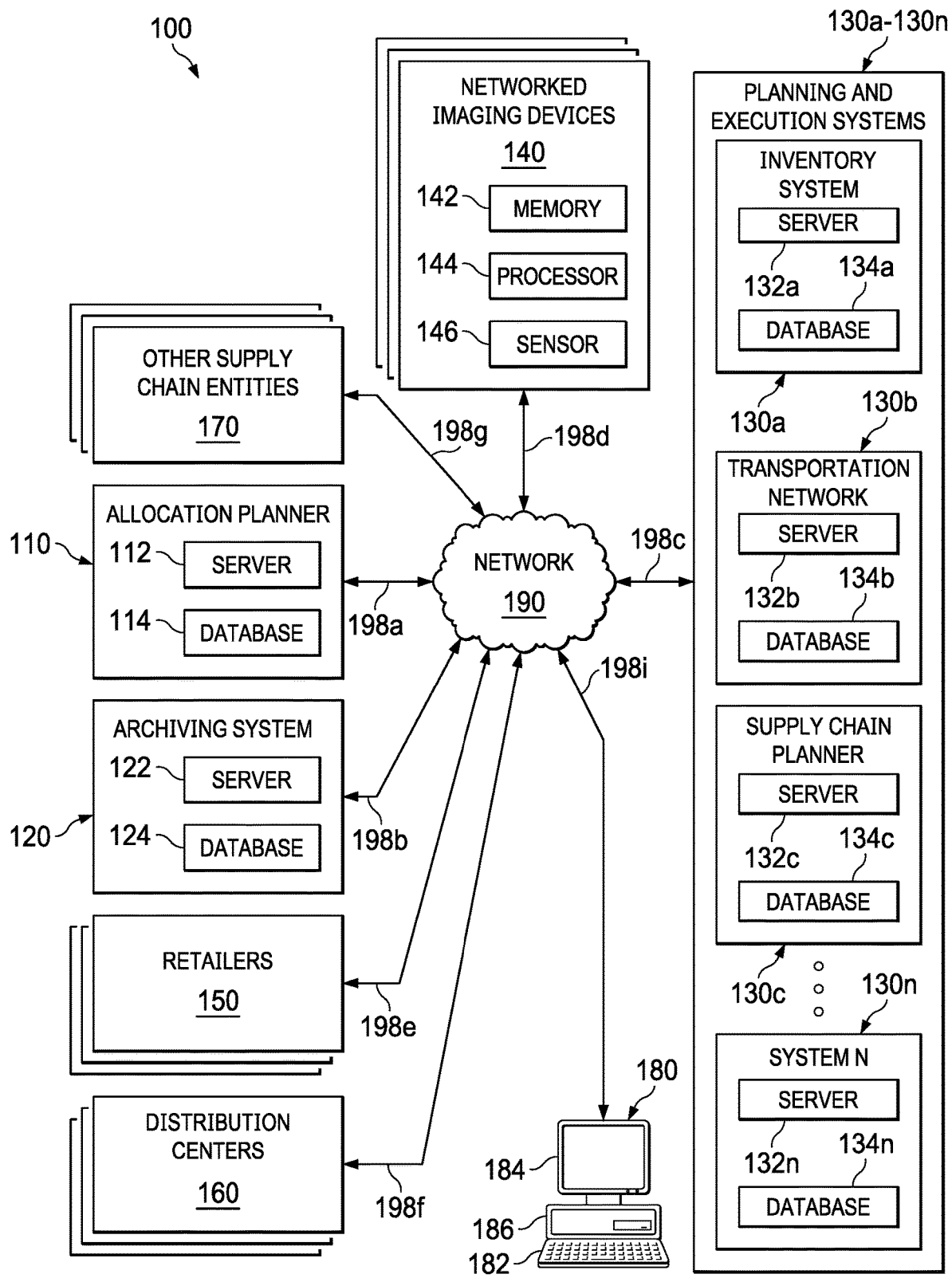
FIG. 1 illustrates a supply chain network, in accordance with a first embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

FIG. 1 illustrates supply chain network 100, in accordance with a first embodiment. Supply chain network 100 comprises allocation planner 110, archiving system 120, one or more planning and execution systems 130a-130n, one or more networked imaging devices 140, one or more retailers 150, one or more distribution centers 160, one or more computers 180, network 190, and communications links 198a-198g. Although a single allocation planner 110, a single archiving system 120, one or more planning and execution systems 130a-130n, one or more networked imaging devices 140, one or more retailers 150, one or more distribution centers 160, one or more computers 180, a single network 190, and one or more communication links 198a-198g are shown and described, embodiments contemplate any number of allocation planners, archiving systems, planning and execution systems, networked imaging devices, retailers, distribution centers, computers, networks, or communication links, according to particular needs.

In one embodiment, allocation planner 110 comprises server 112 and database 114. As described in further detail below, one or more modules of server 112 model an allocation horizon and decision points as a semi-Markov Decision Process (SMDP) with a reward-penalty function 236 that determines the unconstrained quantity (need quantity) or constrained quantity (allocation quantity) of short-life cycle products for stores of one or more retailers 150 and/or one or more distribution centers 160. Short-life cycle product comprise, for example, seasonal products, fashion products, end-of-life items, special buys, test products, and the like. According to embodiments, short-life-cycle products may have an entire lifecycle that finishes in as few as two months and be sold by pushing product to stores in as few as one or two allocations. In one embodiment, allocation planner 110 calculates a need quantity and an allocation quantity for one or more short-life-cycle products at one or more stores 308a-308n (FIG. 3) of one or more retailers 150 using a reinforcement learning-trained model to improve the transportation of products from one or more distributions centers 160 and/or the removal of one or more allocation-limiting constraints, as described in further detail below.

Although short-life cycle products are described as having a life cycle that finishes in as few as two months and being pushed to stores in a few as two allocations, embodiments contemplate allocation planner 110 predicting an allocation for a product having any length of life cycle (such as, for example, one week, two weeks, one month, two months, four months, eight months, a year, a retail season, or any other time period) and pushing the product to stores in any number of allocations (such as, for example, one allocation, two allocation, five allocations, ten allocations, fifty allocations, one hundred allocations, or any other number of allocations), according to particular needs.

Archiving system 120 of supply chain network 100 comprises server 122 and database 124. Although archiving system 120 is shown as comprising a single server 122 and a single database 124, embodiments contemplate any suitable number of servers or databases internal to or externally coupled with archiving system 120. Server 122 of archiving system 120 may support one or more processes for receiving and storing data from allocation planner 110, archiving system 120, one or more planning and execution systems 130a-130n, one or more networked imaging devices 140, one or more retailers 150, one or more distribution centers 160 and one or more computers 180 of supply chain network 100. In one embodiment, archiving system 120 comprises an archive of data received from one or more planning and execution systems 130a-130n, one or more networked imaging devices 140, one or more retailers 150, one or more distribution centers 160 and one or more computers 180 of supply chain network 100. Archiving system 120 provides archived data (which may be stored in database 124 of archiving system 120) to allocation planner 110 and one or more planning and execution systems 130a-130n to, for example, identify one or more independent variables 234 (FIG. 2) used to calculate the need quantity and the allocation quantity. Server 122 may store the received data in database 124. Database 124 of archiving system 120 may comprise one or more databases or other data storage arrangement at one or more locations, local to, or remote from, server 122.

One or more planning and execution systems 130a-130n of supply chain network 100 comprise inventory system 130a, transportation network 130b, supply chain planner 130c, and any number of other planning and execution systems 130n. Although one or more planning and execution systems 130a-130n are shown and described as comprising a single inventory system 130a, a single transportation network 130b, a single supply chain planner 130c, and a single other supply chain planning and execution system 130n, embodiments contemplate any number or combination of one or more planning and execution systems 130a-130n located internal to, or remote from, supply chain network 100, according to particular needs. For example, one or more planning and execution systems 130a-130n typically perform several distinct and dissimilar processes, including, for example, assortment planning, demand planning, operations planning, production planning, supply planning, distribution planning, execution, forecasting, transportation management, warehouse management, inventory management, fulfilment, procurement, allocation, and the like. Planning and execution systems 130a-130n comprise servers 132a-132n having one or more modules, such as, for example, a planning module, a solver, a modeler, and/or an engine, for performing activities of one or more planning and execution processes. Servers 132a-132n store and retrieve data from databases 134a-134n or from one or more locations in supply chain network 100. In addition, one or more planning and execution systems 130a-130n operate on one or more computers 180 that are integral to, or separate from, the hardware and/or software that support allocation planner 110, archiving system 120, one or more planning and execution systems 130a-130n, one or more networked imaging devices 140, one or more retailers 150, and one or more distribution centers 160.

Inventory system 130a comprises server 132a and database 134a. Server 132a of inventory system 130a is configured to receive and transmit item data, including item identifiers, pricing data, attribute data, inventory levels, and other like data about one or more items at one or more stocking locations at stores 308a-308n of one or more retailers 150 and/or one or more distribution centers 160 in supply chain network 100. Server 132a stores and retrieves item data from database 134a or from one or more locations in supply chain network 100.

Although one or more planning and execution systems 130a-130n are shown and described as comprising inventory system 130a, embodiments contemplate one or more planning and execution systems 130a-130n including or working in connection with a warehouse management system. According to embodiments, a server of the warehouse management system comprises one or more modules that manage and operate warehouse operations, plan timing and identity of shipments, generate picklists, packing plans, and instructions in accordance with an allocation determined by allocation planner 110. The warehouse management system instructs users and/or automated machinery to obtain picked items and generates instructions to guide placement of items on a picklist in the configuration and layout determined by a packing plan. For example, the instructions may instruct a user and/or automated machinery to prepare items on a picklist for shipment by obtaining the items from inventory or a staging area and packing the items on a pallet in a proper configuration for shipment. Embodiments contemplate the warehouse management system determining routing, packing, or placement of any item, package, or container into any packing area, including, packing any item, package, or container in another item, package, or container to transport items from a current location to an allocation location and in a quantity determined by allocation planner 110. The warehouse management system may generate instructions for packing products into boxes, packing boxes onto pallets, packing loaded pallets into trucks, or placing any item, container, or package in a packing area, such as, for example, a box, a pallet, a shipping container, a transportation vehicle, a shelf, a designated location in a warehouse (such as a staging area), and the like.

By way of a further example only and not by way of limitation, one or more planning and execution systems 130a-130n include transportation network 130b. Transportation network 130b comprises server 132b and database 134b. According to embodiments, transportation network 130b directs one or more transportation vehicles 310a-310n (FIG. 3) to ship one or more items between one or more retailers 150 and one or more distribution centers 160, based, at least in part, on a need quantity and an allocation quantity generated by allocation planner 110. One or more transportation vehicles 310a-310n comprise, for example, any number of trucks, cars, vans, boats, airplanes, unmanned aerial vehicles (UAVs), cranes, robotic machinery, or the like. One or more transportation vehicles 310a-310n may comprise radio, satellite, or other communication systems that communicate location information (such as, for example, geographic coordinates, distance from a location, global positioning satellite (GPS) information, or the like)

with allocation planner 110, inventory system 130a, transportation network 130b, one or more retailers 150, and one or more distribution centers 160 to identify the location of one or more transportation vehicles 310a-310n and the location of any inventory or shipment located on one or more transportation vehicles 310a-310n. In addition to the constrained or unconstrained allocation quantity, the number of items shipped by one or more transportation vehicles 310a-310n in transportation network 130b may also be based, at least in part, on an inventory policy, target service levels, the quantity of items currently in stock at an inventory of one or more retailers 150, one or more distribution centers 160, or one or more other supply chain entities 170, the number of items currently in transit in transportation network 130b, a forecasted demand, a supply chain disruption, and the like.

As disclosed above, one or more planning and execution systems 130a-130n may include supply chain planner 130c. Supply chain planner 130c comprises server 132c and database 134c. In one embodiment, a solver of supply chain planner 130c solves supply chain planning problems (such as, for example, supply planning problems and allocation planning problems) and transmits the solutions to allocation planner 110 to construct what-if scenarios 238 (FIG. 2) using user inputs and constraints, as described in further detail below.

In one embodiment, one or more supply chain planning solvers (such as, for example, an LP solver, a MAP solver, a Deep Tree solver, and the like) construct a model representing the dynamic and static structure of a supply chain network and generate a solution or other output generated when solving the model. The model object may comprise a mathematical formulation of the supply chain planning problem, which includes the network structure and the dynamic properties, such as, for example, capacity constraints, material constraints, operations, yield rate, lead times, inventory levels, safety stock, demand dates, and the like.

One or more networked imaging devices 140 comprise one or more electronic devices having one or more processors 142, memory 144, one or more sensors 146, and may include any suitable input device, output device, fixed or removable computer-readable storage media, or the like. According to embodiments, one or more networked imaging devices 140 identify one or more items near one or more sensors 146 and generate a mapping of the identified one or more items in supply chain network 100. As explained in more detail below, allocation planner 110, one or more planning and execution systems 130a-130n (including, but not limited to, inventory system 130a and transportation network 130b), one or more retailers 150, and one or more distribution centers 160 use the mapping of an item to locate the item in supply chain network 100. The location of the item may then be used to coordinate the storage and transportation of the same item or other items in supply chain network 100.

According to embodiments, one or more networked imaging devices 140 comprise a mobile handheld device such as, for example, a smartphone, a tablet computer, a wireless device, a networked electronic device, or the like. One or more networked imaging devices 140 may be configured to transmit item identifiers to one or more databases local to, or remote from, supply chain network 100 in response to scanning one or items by one or more sensors 146. This may include, for example, a stationary scanner located at transportation network 132a (including one or more transportation vehicles 310a-310n), one or more retailers 150, one or more distribution centers 160, and/or one or more other supply chain entities 170 that identifies items as the items pass near the scanner, such as, for example, a point of sale system at stores 308a-308n of one or more retailers 150 that records transactions (sales, returns, etc.) and generates associations between sales data 220 (which may include, for example, time and date stamps, prices, discounts, sale or return quantity, and the like), product data 222 (which may include, for example, product identity and attributes), store data 224, customer data 226, inventory data 228, market trends data 232, and the like. One or more sensors 146 of one or more networked imaging devices 140 may comprise an imaging sensor, such as, a camera, scanner, electronic eye, photodiode, charged coupled device (CCD), barcode scanner, or any sensor that detects electromagnetic radiation from, for example, products, product images, labels, barcodes, or the like. In addition, or as an alternative, one or more sensors 146 may comprise a radio receiver and/or transmitter configured to read an electronic tag coupled with a product, such as, for example, an RFID tag.

In addition, one or more sensors 146 of one or more networked imaging devices 140 may be located at one or more locations local to, or remote from, one or more networked imaging devices 140, including, for example, one or more sensors 146 integrated into one or more networked imaging devices 140 or one or more sensors 146 remotely located from, but communicatively coupled with, one or more networked imaging devices 140. According to some embodiments, one or more sensors 146 may be configured to communicate directly or indirectly with one or more of allocation planner 110, archiving system 120, one or more planning and execution systems 130a-130n, one or more networked imaging devices 140, one or more retailers 150, one or more distribution centers 160, one or more computers 180, and/or network 190 using one or more communication links 198a-198g.

One or more retailers 150 may be any suitable entity that obtains one or more products to sell to one or more customers. One or more retailers 150 may comprise one or more brick-and-mortar or online stores. Stores 308a-308n of one or more retailers 150 may sell products according to rules, strategies, orders, and/or guidelines developed by one or more retail headquarters. For example, the retail headquarters may create product allocations, assign product allocations to stores 308a-308n or store clusters, and instruct one or more distribution centers 160 or other one or more supply chain entities 170 to supply products in the product allocation to stores 308a-308n or store clusters in an amount sufficient to meet an expected product need quantity, allocation quantity, or other determined quantity. One or more retailers 150 may comprise stores with shelving systems or other retail displays. Retail displays may comprise, for example, various racks, fixtures, brackets, notches, grooves, slots, or other attachment devices for fixing shelves or racks in various configurations. These configurations may comprise retail displays with adjustable lengths, heights, and other arrangements, which may be adjusted by an employee of retailers based on computer-generated instructions or automatically by machinery to place products in a desired location in one or more retailers 150. According to embodiments, one or more retailers 150 retain some quantity or one or more products for display by the retail displays in stores 308a-308n. This quantity of one or more products held for display by a retail store may be referred to as the minimum presentation quantity, which, as described in more detail below, may constitute the minimum quantity of product stock that is allocated to stores 308a-308n of one or more retailers 150. Although the minimum quantity of product allocated to stores 308a-308n of one or more retailers 150 may comprise a minimum presentation quantity, a product allocation may be based, at least in part, on a constrained or unconstrained allocation quantity generated by allocation planner 110, an inventory policy, target service levels, the number of items currently in stock at an inventory of one or more retailers 150, one or more distribution centers 160, or one or more other supply chain entities 170, the number of items currently in transit in transportation network 132a, a forecasted demand, a supply chain disruption, and/or one or more other like factors discussed herein.

One or more distribution centers 160 may be any suitable entity that offers to store or otherwise distribute at least one product to one or more retailers 150 and/or customers. One or more distribution centers 160 may, for example, receive a product from a first one or more supply chain entities (such as, for example, one or more suppliers or one or more manufacturers) in supply chain network 100 and store and transport the product for a second one or more supply chain entities (such as, for example, one or more retailers 150). One or more distribution centers 160 may comprise automated warehousing systems that automatically remove products from, and place products into, inventory based, at least in part, on a need quantity or allocation quantity generated by allocation planner 110, an inventory policy, target service levels, the number of items currently in stock at an inventory of one or more retailers 150, one or more distribution centers 160, or one or more other supply chain entities 170, the number of items currently in transit in transportation network 130b, a forecasted demand, a supply chain disruption, and/or one or more other like factors discussed herein.

Although supply chain network 100 is described as comprising one or more retailers 150 and one or more distribution centers 160, supply chain network 100 may comprise any number of one or more other supply chain entities 170, representing any number of one or more supply chain networks, including one or more enterprises, such as, for example networks of one or more retailers 150, distribution centers 160, manufacturers, suppliers, customers, and/or the like.

One or more suppliers may be any suitable entity that offers to sell or otherwise provides one or more items (i.e., materials, components, or products) to one or more manufacturers. The one or more suppliers may comprise automated distribution systems that automatically transport products to the one or more manufacturers based, at least in part, on a constrained or unconstrained allocation quantity generated by allocation planner 110, an inventory policy, target service levels, the number of items currently in stock at an inventory of one or more retailers 150, one or more distribution centers 160, or one or more other supply chain entities 170, the number of items currently in transit in transportation network 130b, a forecasted demand, a supply chain disruption, and/or one or more other like factors discussed herein. In addition, or as an alternative, each of the one or more items may be represented in supply chain network 100 by an identifier, including, for example, Stock-Keeping Unit (SKU), Universal Product Code (UPC), serial number, barcode, tag, RFID, or any other device that encodes identifying information. As discussed above, one or more networked imaging devices 140 may generate a mapping of one or more items in supply chain network 100 by scanning an identifier associated with an item or associating the image of an item with an identifier stored in database 134a.

One or more manufacturers may be any suitable entity that manufactures at least one product. The one or more manufacturers may use one or more items during the manufacturing process to produce any manufactured, fabricated, assembled, or otherwise processed item, material, component, good or product. In one embodiment, a product represents an item ready to be supplied to, for example, one or more retailers 150 and one or more distribution centers 160 in supply chain network 100, an item that needs further processing, or any other item. The one or more manufacturers may, for example, produce and sell a product to one or more retailers 150, one or more distribution centers 160, one or more suppliers, other manufacturers, a customer, or any other suitable person or entity. The one or more manufacturers may comprise automated robotic production machinery that produce products based, at least in part, on a need quantity or allocation quantity generated by allocation planner 110, an inventory policy, target service levels, the number of items currently in stock at an inventory of one or more retailers 150, one or more distribution centers 160, or one or more other supply chain entities 170, the number of items currently in transit in transportation network 132a, a forecasted demand, a supply chain disruption, and/or one or more other like factors discussed herein.

Although one or more retailers 150 and one or more distribution centers 160 are shown and described as separate and distinct entities, any one of one or more retailers 150, one or more distribution centers 160, or other one or more supply chain entities 170 may simultaneously act as any other one of one or more supply chain entities. For example, a manufacturer may produce a product, and the same entity may act as supplier to supply an item to itself or another of one or more supply chain entities. Although one example of supply chain network 100 is shown and described, embodiments contemplate any configuration of supply chain network 100, without departing from the scope described herein.

As shown in FIG. 1, supply chain network 100 operates on one or more computers 180 that are integral to or separate from the hardware and/or software that support allocation planner 110, archiving system 120, one or more planning and execution systems 130a-130n, one or more networked imaging devices 140, one or more retailers 150, and one or more distribution centers 160. One or more computers 180 may include any suitable input device 182, such as a keypad, mouse, touch screen, microphone, or other device to input information. Output devices 184 may convey information associated with the operation of supply chain network 100, including digital or analog data, visual information, or audio information. One or more computers 180 may include fixed or removable computer-readable storage media, including a non-transitory computer readable medium, magnetic computer disk, flash drive, CD-ROM, in-memory device or other suitable media to receive output from and provide input to supply chain network 100. One or more computers 180 may include one or more processors 186 and associated memory to execute instructions and manipulate information according to the operation of supply chain network 100 and any of the methods described herein. In addition, or as an alternative, embodiments contemplate executing the instructions on one or more computers 180 that cause one or more computers 180 to perform functions of the method. An apparatus implementing special purpose logic circuitry, for example, one or more field programmable gate arrays (FPGA) or application-specific integrated circuits (ASIC), may perform functions of the methods described herein. Further examples may also include articles of manufacture including tangible computer-readable media that have computer-readable instructions encoded thereon, and the instructions may comprise instructions to perform functions of the methods described herein.

In addition, and as discussed herein, supply chain network 100 may comprise a cloud-based computing system having processing and storage devices at one or more locations, local to, or remote from allocation planner 110, archiving system 120, one or more planning and execution systems 130a-130n, one or more networked imaging devices 140, one or more retailers 150, and one or more distribution centers 160. In addition, each of the one or more computers 180 may be a workstation, personal computer (PC), network computer, notebook computer, tablet, personal digital assistant (PDA), cell phone, telephone, smartphone, wireless data port, augmented or virtual reality headset, or any other suitable computing device. In one embodiment, one or more users may be associated with allocation planner 110, archiving system 120, one or more planning and execution systems 130a-130n, one or more networked imaging devices 140, one or more retailers 150, and one or more distribution centers 160. These one or more users may include, for example, a "buyer" or a "planner" handling product allocation, training a machine-learning model, predicting allocations using the trained machine-learning model, segmentation or clustering of products, customers, channels, stores, and the like, managing the inventory of items, imaging items, managing storage and shipment of items, and/or one or more related tasks within supply chain network 100. In addition, or as an alternative, these one or more users within supply chain network 100 may include, for example, one or more computers 180 programmed to autonomously handle, among other things, evaluation of various levels of retail process management, determining an allocation plan, forecasting demand, controlling manufacturing equipment, and adjusting various levels of manufacturing and inventory levels at various stocking points and distribution centers, and/or one or more related tasks within supply chain network 100.

In one embodiment, allocation planner 110 may be coupled with network 190 using communication link 198a, which may be any wireline, wireless, or other link suitable to support data communications between allocation planner 110 and network 190 during operation of supply chain network 100. In one embodiment, archiving system 120 may be coupled with network 190 using communication link 198b, which may be any wireline, wireless, or other link suitable to support data communications between archiving system 120 and network 190 during operation of supply chain network 100. One or more planning and executions systems 130a-130n may be coupled with network 190 using communication link 198c, which may be any wireline, wireless, or other link suitable to support data communications between one or more planning and executions systems 130a-130n and network 190 during operation of supply chain network 100. One or more networked imaging devices 140 may be coupled with network 190 using communication link 198d, which may be any wireline, wireless, or other link suitable to support data communications between one or more networked imaging devices 140 and network 190 during operation of supply chain network 100. One or more retailers 150 may be coupled with network 190 using communication link 198e, which may be any wireline, wireless, or other link suitable to support data communications between one or more retailers 150 and network 190 during operation of supply chain network 100. One or more distribution centers 160 may be coupled with network 190 using communication link 198f, which may be any wireline, wireless, or other link suitable to support data communications between one or more distribution centers 160 and network 190 during operation of supply chain network 100. One or more computers 180 may be coupled with network 190 using communication link 198g, which may be any wireline, wireless, or other link suitable to support data communications between one or more computers 180 and network 190 during operation of supply chain network 100. Although communications links 198a-198g are shown as generally coupling allocation planner 110, archiving system 120, one or more planning and execution systems 130a-130n, one or more networked imaging devices 140, one or more retailers 150, one or more distribution centers 160, and one or more computers 180 to network 190, each of allocation planner 110, archiving system 120, one or more planning and execution systems 130a-130n, one or more networked imaging devices 140, one or more retailers 150, one or more distribution centers 160 and one or more computers 180 may communicate directly with each other, according to particular needs.

In another embodiment, network 190 includes the Internet and any appropriate local area networks (LANs), metropolitan area networks (MANs), or wide area networks (WANs) coupling allocation planner 110, archiving system 120, one or more planning and execution systems 130a-130n, one or more networked imaging devices 140, one or more retailers 150, one or more distribution centers 160 and one or more computers 180. For example, data may be maintained by locally or externally of allocation planner 110, archiving system 120, one or more planning and execution systems 130a-130n, one or more networked imaging devices 140, one or more retailers 150, one or more distribution centers 160 and one or more computers 180 and made available to one or more associated users of allocation planner 110, archiving system 120, one or more planning and execution systems 130a-130n, one or more networked imaging devices 140, one or more retailers 150, one or more distribution centers 160 and one or more computers 180 using network 190 or in any other appropriate manner. For example, data may be maintained in a cloud database at one or more locations external to allocation planner 110, archiving system 120, one or more planning and execution systems 130a-130n, one or more networked imaging devices 140, one or more retailers 150, one or more distribution centers 160 and one or more computers 180 and made available to one or more associated users of allocation planner 110, archiving system 120, one or more planning and execution systems 130a-130n, one or more networked imaging devices 140, one or more retailers 150, one or more distribution centers 160 and one or more computers 180 using the cloud or in any other appropriate manner. Those skilled in the art will recognize that the complete structure and operation of network 190 and other components within supply chain network 100 are not depicted or described. Embodiments may be employed in conjunction with known communications networks and other components.

According to embodiments, allocation planner 110 may place product orders at one or more distribution centers 180, suppliers, and manufacturers, initiate manufacturing of products at manufacturers, and/or determine the assortment and quantity of products to be carried at one or more retailers 150. Furthermore, allocation planner 110 may instruct automated machinery (i.e., robotic warehouse systems, robotic inventory systems, automated guided vehicles, mobile racking units, automated robotic production machinery, robotic devices and the like) to adjust product mix ratios, inventory levels at various stocking points, production of products of manufacturing equipment, proportional or alternative sourcing of one or more retailers 150 and one or more distribution centers 160, and the configuration and quantity of packaging and shipping of items based on the product allocation, store clusters, current inventory, and/or production levels. For example, the methods described herein may include one or more computers 180 receiving product data 222 from one or more sensors of automated machinery, and product data 222 corresponds to an item detected by the automated machinery. Received product data 222 may include an image of the item, an identifier, as described above, and/or other data associated with the item (dimensions, texture, estimated weight, and any other like data). Method 500 may further include one or more computers 180 looking up received product data 222 in a database system associated with allocation planner 110, archiving system 120, one or more planning and execution systems 130a-130n, one or more retailers 150, and/or one or more distribution centers 160 to identify the item corresponding to the data received from the automated machinery. One or more computers 180 may also receive, from the automated machinery, a current location of the identified item. Based on the identification of the item, one or more computers 180 may also identify (or alternatively generate) a first mapping in the database system, where the first mapping is associated with the current location of the item. One or more computers 180 may also identify a second mapping in the database system, where the second mapping is associated with a past location of the identified item. One or more computers 180 may also compare the first mapping and the second mapping to determine if the current location of the identified item in the first mapping is different than the past location of the identified item in the second mapping. One or more computers 180 may then send instructions to the automated machinery based, as least in part, on one or more differences between the first mapping and the second mapping such as, for example, to locate item to add to or remove from an inventory of or shipment for one or more retailers 150 and one or more distribution centers 160. In addition, or as an alternative, allocation planner 110 monitors the supply chain constraints of one or more items at one or more retailers 150 and one or more distribution centers 160 and adjusts the allocations and/or inventory of one or more supply chain entities based on the supply chain constraints. In addition, or as an alternative, one or more computers 180 may monitor the inventory of one or more retailers 150 and one or more distribution centers 160 in supply chain network 100 that when the inventory of an item falls to a resupply quantity, allocation planner 110 may initiate one or more processes that then automatically adjusts product mix ratios, inventory levels, production of products of manufacturing equipment, and proportional or alternative sourcing of one or more retailers 150 and one or more distribution centers 160 until the inventory is resupplied to a target level.

Figure 2:
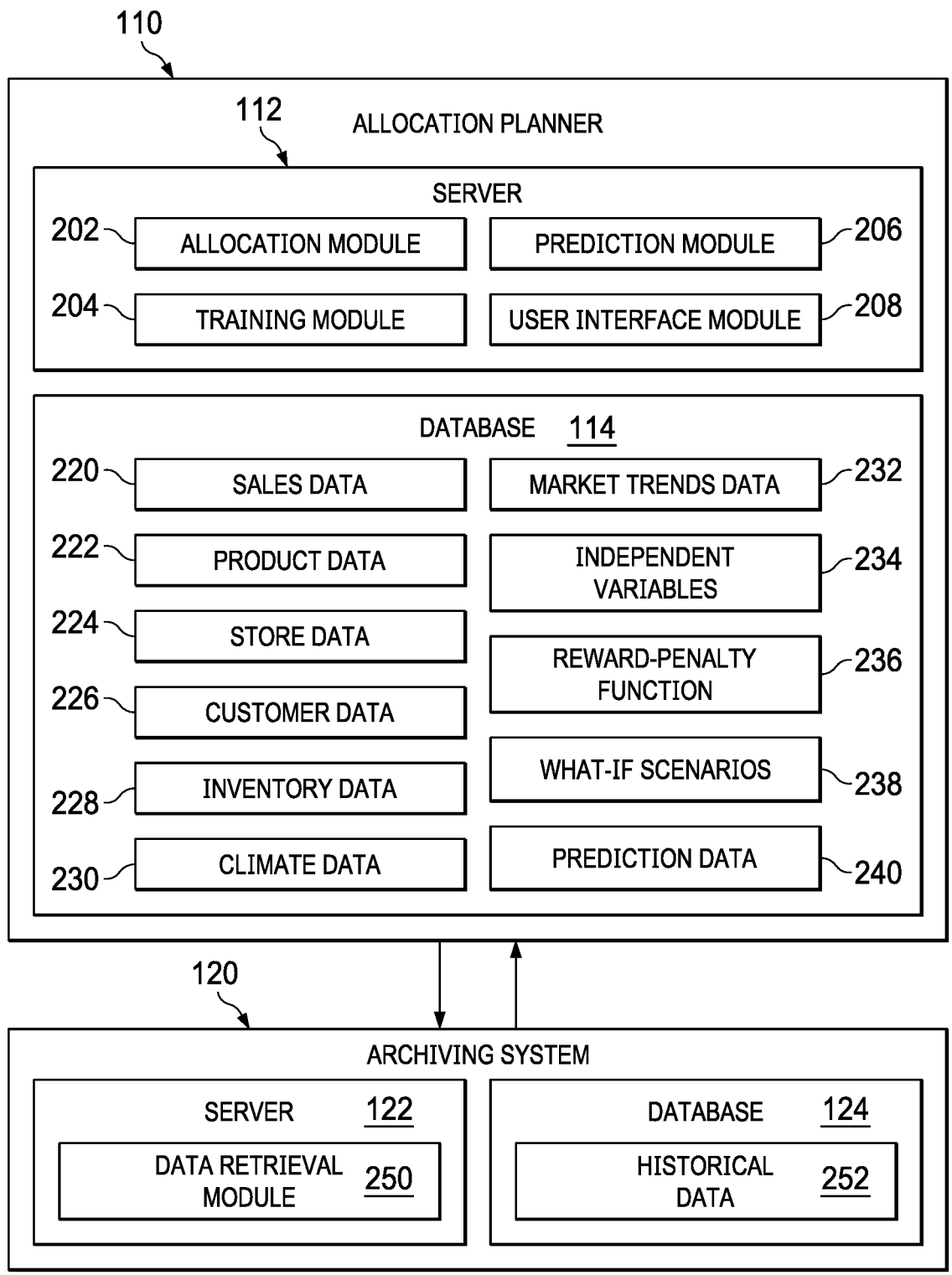
FIG. 2 illustrates the allocation planner and the archiving system of FIG. 1 in greater detail, in accordance with the first embodiment.

FIG. 2 illustrates allocation planner 110 and archiving system 120 of FIG. 1 in greater detail, in accordance with the first embodiment. As discussed above, allocation planner 110 comprises server 112 and database 114. According to one embodiment, server 112 comprises allocation module 202, training module 204, prediction module 206, and user interface module 208. Although server 112 is shown and described as comprising single allocation module 202, a single training module 204, a single prediction module 206, and a single user interface module 208, embodiments contemplate any suitable number or combination of these located at one or more locations local to, or remote from, allocation planner 110, such as one or more servers or computers at any location in supply chain network 100.

Allocation module 202 of server 112 generates the need quantity and/or allocation quantity based, at least in part, on product types, life-cycle, and supply chain constraints. According to one embodiment, allocation module 202 generates analytical allocation insights and metrics that provide for maximizing the profit of stores 308a-308n of one or more retailers 150 by optimizing a future allocation based, at least in part, on one or more independent variables 234. As described in further detail below, training module 204 may identify the one or more independent variables 234 from historical data 252 relating to one or more products and prescribe an allocation quantity at one or more stores 308a-308n based, at least in part, on the overall profit across all stores of one or more retailers 150 to reduce mark down impact and reduce stock outs. In addition, or as an alternative, training module 204 calculates independent variables 234 for a product, product category, product grouping, one or more machine learning-based product clusters, customer clusters, channel clusters, store clusters, a combination of the foregoing or other like groupings, as described in further detail below. After determining independent variables 234 that are responsible for sales of the short-life cycle products, training module 204 calculates reward-penalty function 236 from independent variables 234 for historical allocations. Training module 204 uses reinforced learning to calculate an optimal or near-optimal allocation quantity for maximizing profits using reward-penalty function 236 and modeling historical allocations as what-if scenarios 238. Training module 204 further simulates what-if scenarios 238 based on the historical allocations to identify what allocations would have maximized profit (or minimized loss) for the historical allocations. Based at least in on part on the simulated what-if scenarios 238, prediction module 206 retrieves historical data 252 most similar to a current allocation problem, as calculated by, for example, machine-learning based clustering and/or a distance calculation and calculates the optimal allocation quantity (a constrained allocation quantity) and the product need (an unconstrained allocation quantity) for current allocations of a product at a current inventory state.

According to embodiments, user interface module 208 displays a GUI comprising interactive graphical elements for generating and viewing mappings, charts, and calculated quantities of constrained and unconstrained allocation quantities, and the like. In addition, or as an alternative, the GUI user interface module 208 may comprise interactive elements for selecting or modifying one or more items, clusters, variables, model parameters, cost factors, constraints, casual factors, such as, for example, sales, previous allocations, market trends, customer behaviors, inventory positioning, and profit optimization, and, in response to the selection or modification calculating the need quantity or allocation quantity for supply chain network 100. By providing both constrained and unconstrained allocation quantities, allocation planner 110 provides insight and a mechanism to determine whether increasing supply over the product need at one or more distribution centers 160 might generate greater profit, as described in further detail below.

Database 114 of allocation planner 110 comprises one or more databases or other data storage arrangements at one or more locations, local to, or remote from, server 112. Database 114 comprises, for example, sales data 220, product data 222, store data 224, customer data 226, inventory data 228, climate data 230, market trends data 232, independent variables 234, reward-penalty function 236, what-if scenarios 238, and prediction data 240. Although, database 114 is shown and described as comprising sales data 220, product data 222, store data 224, customer data 226, inventory data 228, climate data 230, market trends data 232, independent variables 234, reward-penalty function 236, what-if scenarios 238, and prediction data 240, embodiments contemplate any suitable number or combination of these, located at one or more locations, local to, or remote from, allocation planner 110, according to particular needs.

Sales data 220 of database 114 may comprise recorded sales and returns transactions and related data, including, for example, a transaction identification, time and date stamp, channel identification, such as stores or online touch-points, product identification, actual cost, selling price, sales quantity, customer identification, promotions, and or the like. In addition, sales data 220 may be represented by any suitable combination of values and dimensions, aggregated or unaggregated, such as, for example, sales per week, sales per week per location, sales per day, sales per day per season, or the like.

Product data 222 of database 114 may comprise one or more data structures comprising products identified by, for example, a product identifier, as disclosed above, and one or more attributes and attribute types associated with the product identifier, which may be stored as attribute data. Product data 222 may comprise any attributes of one or more products organized according to any suitable database structure, and sorted by, for example, attribute type, attribute, value, product identification, or any suitable categorization or dimension. Attributes of one or more items may be, for example, any categorical characteristic or quality of an item, and an attribute value may be a specific value or identity for the one or more items according to the categorical characteristic or quality. By way of example only and not of limitation, a product, such as clothing, may be defined by one or more attributes, including, for example, color, material, design, pattern, length or the like. Each attribute may have a different attribute value. These attribute values include, for example, red, blue, green (for color), silk, cotton, polyester (for material), fashion, basic, classic (for design), striped, floral, plaid (for pattern), long, short, high, (for length), and other like attributes and attribute values, according to particular needs. These attributes also determine, at least in part, customer preferences, individually and as customer segments defined by similar customer shopping behavior, preferences for purchasing items with particular attribute values, or a combination of both.

In addition, or as an alternative, a goal of allocation planning is to choose a quantity of a short-life-cycle products to sell during a planning period that matches predicted customer preferences during the same planning period. By way of a first example, this may include a grocery, pharmacy, or other retailer located in a temperate climate, selling sun care products (such as, for example, sunscreen, and the like) only during a short summer season. As a second example, this may include, for a clothing retailer, choosing an allocation of different clothing products that will match the style, colors, season, and trends predicted to be favored by customers during a planning period. Additionally, products may be organized in product categories. A product category indicates a level in a product hierarchy under which all products are described by the same attributes and/or the products are perceived by customers as being substitutable. For example, product category levels in the clothing retail industry may include women's dresses, men's pants, women's shoes, men's shoes, and the like, according to particular needs. However, product category levels may be more specific such as, for example, women's athletic shoes, women's casual shoes, and other like categories. Embodiments contemplate product category levels for retail products that are more specific or less specific categories of products, depending on particular needs.

Although allocation planning is described in connection with a clothing retailer with clothing having particular attributes and attribute values, embodiments contemplate allocation planning for any one or more retailers 150, including, for example, fashion retailers, grocery retailers, parts retailers, and the like and products having any suitable attributes or attribute values, according to particular needs.

Store data 224 of database 114 may comprise data describing stores 308a-308n of one or more retailers 150 and related store information. Store data 224 may comprise, for example, a store identifier, store description, store location details, store location climate, store type, store opening date, lifestyle, store area (expressed in, for example, square feet, square meters, or other suitable measurement), latitude, longitude, other geographic data, and the like. Store data 224 may include the identity and location of stores 308a-308n grouped by store profiles into one or more store clusters. According to embodiments, store profiles comprises the identity of one or more store clusters which may be used to allocate products targeted to the customer preferences associated with stores 308a-308n.

Customer data 226 may comprise customer identity information, including, for example, customer relationship management data, loyalty programs, and mappings that associate product purchases and other transactions with one or more customers. Customer data 226 may include one or more customer preferences segments or clusters grouped according to one or more customer profiles comprising characteristics, such as goals, motivations, or preferences. Each customer profile may also be identified by assigning a name and image to the segment. Allocation planner 110 may use customer profiles to analyze, sort, understand, and cluster current or historical data 252 to identify a suitable grouping of stores for allocation planning.

Inventory data 228 of database 114 may comprise any data relating to current or projected inventory quantities or states, order rules, or the like. For example, inventory data 228 may comprise the current level of inventory for each item at one or more stocking points at one or more retailers 150, one or more distribution centers 160, or one or more other supply chain entities 170 in supply chain network 100. In addition, inventory data 228 may comprise order rules that describe one or more rules or limits on setting an inventory policy, including, but not limited to, a minimum order quantity, a maximum order quantity, a discount, and a step-size order quantity, and batch quantity rules. According to some embodiments, allocation planner 110 accesses and stores inventory data 228 in database 114 of allocation planner 110 and/or database 132a of inventory system 130a, which may be used by allocation planner 110 to place orders, set inventory levels at one or more stocking points, initiate manufacturing of one or more components, or the like. In addition, or as an alternative, inventory data 228 may be updated by receiving current item quantities, mappings, or locations from inventory system 130a and/or transportation network 130b.

According to one embodiment, inventory data 228 includes inventory policies. Inventory policies may, for example, describe the reorder point and target quantity, or other inventory policy parameters that set rules for allocation planner 110, inventory system 130a, and transportation network 132a to manage and reorder inventory. These inventory policies may be based on target service level, demand, cost, fill rate, or the like. Allocation planner 110 may determine inventory policies that comprise target service levels that ensure that a service level of stores 308a-308n of one or more retailers 150 is met with a certain probability. For example, one or more retailers 150 may set a service level at 95%, meaning one or more retailers 150 and/or one or more distribution centers 160 will set the desired inventory stock level at a level that meets demand of stores 308a-308n 95% of the time. Although, a particular target service level and percentage is described, embodiments contemplate any service level or target service level, for example, a service level of approximately 99% through 90%, a 75% service level, or any suitable service level, according to particular needs. Other types of service levels associated with inventory quantity or order quantity may comprise, but are not limited to, a maximum expected backlog and a fulfillment level.

Climate data 230 of database 114 comprises data indicating the temperature and weather that influences sales of items at stores 308a-308n of one or more retailers 150. By way of example only and not of limitation, climate data 230 indicating a hot temperature is associated with increased sales of cold drinks, and climate data 230 indicating a cold climate is associated with increased sales of hot drinks.

Market trends data 232 of database 114 comprises short-term signals (such as, for example, a sudden spike or drop in demand) and long-term signals (such as, for example, trends influenced by demographic changes). In one embodiment, market trends data 232 are calculated from sales data 220. By way of example only and not of limitation, market trends data 232 may be represented mathematically by a categorical variable (such as, for example, a number indicating whether the trend is decreasing (−1), neutral (0), or increasing (1)) or by continuous variables (such as, for example, changes in sales week over week). Although particular examples of categorical variables and continuous variables are described, market trends data 232 may comprise any other suitable form, according to particular needs. According to one embodiment, market trends data 232 includes demand forecasts that may indicate future expected demand based on, for example, any data relating to past sales, past demand, purchase data, promotions, events, or the like of stores 308a-308n of one or more retailers 150. The demand forecasts may cover a time interval such as, for example, by the minute, hour, daily, weekly, monthly, quarterly, yearly, or any suitable time interval, according to particular needs.

Independent variables 234 of database 114 comprise variables identified from historical data (including, for example, the above-described data stored in database 114) that affect reward-penalty function 236, as described in further detail below. By way of example only and not of limitation, independent variables 234 may include one or more of: average (mean, median, or mode) sales, variability of sales (measured by, for example, standard deviation), previous actions (receipts sent, which is a previous allocation quantity) lags of demand, seasonal factor (a variable included to represent seasonality in sales), location cluster (a cluster of stores 308a-308n of one or more retailers 150 that have similar customer behavior or characteristics, climate, market trends, store size, or other types of store clustering factors), product attributes, such as, for example for fashion: color, sleeve length etc. and price (which captures promotion and markdown events). According to one embodiment, independent variables 234 are a fixed set. In the alternative, independent variables 234 are unfixed and calculated based on the regression of the correlation of the reward-penalty calculation and historical data 252. For example, when independent variables 234 are identified as sales, the timing and size of the last allocation, customer behaviors, inventory positioning (the location and quantities of inventory at one or more stocking locations in supply chain network 100), profit optimization, and one or more causal factors (such as, for example, climate, demographics, market trends, and the like), prediction module 208 identifies a past state having similar independent factors, a similar allocation, and a similar product to determine a current allocation of the product. Prediction module 208 provides prescriptive allocation strategies based on product types, life cycle, and supply chain constraints to generate analytical allocation insights and metrics.

Reward-penalty function 236 of database 114 is selected to evaluate the suitability of a particular past action. For example, reward-penalty function 236 gives the profit or loss for a particular action. However, as described in further detail below, reward-penalty function 236 may be selected to evaluate a key process indicator (KPI). For example, where the selected KPI is service level, reward-penalty function 236 may express the value of each action as a number of unmet demands or a percentage of stockout situations.

What-if scenarios 238 of database 114 comprise simulated scenarios for allocations taken in the past and are used to identify an allocation decision that would have increased or maximized the profit using reward-penalty function 236. Prediction data 240 of database 114 comprise the constrained and/or unconstrained allocation quantities calculated by prediction module 206 based, at least in part, on independent variables 234, reward-penalty function 236, and what-if scenarios 238.

As disclosed above, archiving system 120 comprises server 122 and database 124. Although archiving system 120 is shown as comprising a single server 122 and a single database 124, embodiments contemplate any suitable number of servers or databases internal to or externally coupled with archiving system 120.

Server 122 of archiving system 120 comprises data retrieval module 250. Although server 122 is shown and described as comprising a single data retrieval module 250, embodiments contemplate any suitable number or combination of data retrieval modules located at one or more locations, local to, or remote from archiving system 120, such as on multiple servers or one or more computers 180 at one or more locations in supply chain network 100.

In one embodiment, data retrieval module 250 of archiving system 120 receives historical data 252 from one or more planning and execution systems 130a-130n, one or more networked imaging devices 140, one or more retailers 150, and one or more distribution centers 160, and/or one or more other supply chain entities 170 and stores the received historical data 252 in database 124. According to one embodiment, data retrieval module 250 may prepare historical data 252 for use by training module 204 to generate what-if scenarios 238 by checking historical data 252 for errors and transforming historical data 252 to normalize, aggregate, and/or directly compare data received from different planning and execution systems 130a-130n, one or more networked imaging devices 140, one or more retailers 150, one or more distribution centers 160, and/or one or more other supply chain entities 170 at one or more locations local to, or remote from, archiving system 120. According to embodiments, data retrieval module 252 receives data from one or more sources external to supply chain network 100, such as, for example, weather data, special events data, social media data, calendars, and the like and stores the received data as historical data 252.

Database 124 of archiving system 120 may comprise one or more databases or other data storage arrangement at one or more locations, local to, or remote from, the server. Database 124 of archiving system 120 comprises, for example, historical data 252. Although database 124 of archiving system 120 is shown and described as comprising historical data 252, embodiments contemplate any suitable number or combination of data, located at one or more locations, local to, or remote from, archiving system 120, according to particular needs. Historical data 252 comprises data received from the allocation planner 110, archiving system 120, one or more planning and execution systems 130a-130n, one or more networked imaging devices 140, one or more retailers 150, one or more distribution centers 160, one or more computers 180, and/or one or more locations local to, or remote from, supply chain network 100, such as, for example, weather data, special events data, social media data, calendars, and the like. According to one embodiment, historical data 252 comprises historic sales patterns, prices, promotions, weather conditions and other factors influencing demand of one or more items sold in stores 308a-308n over a time period, such as, for example, one or more days, weeks, months, years, including, for example, a day of the week, a day of the month, a day of the year, week of the month, week of the year, month of the year, special events, paydays, and the like. When generating what-if scenarios 236, allocation planner 110 may calculate reward-penalty function 236 over a historical time period, such as, for example, any of the time periods represented by historical data 252.

Figure 3:
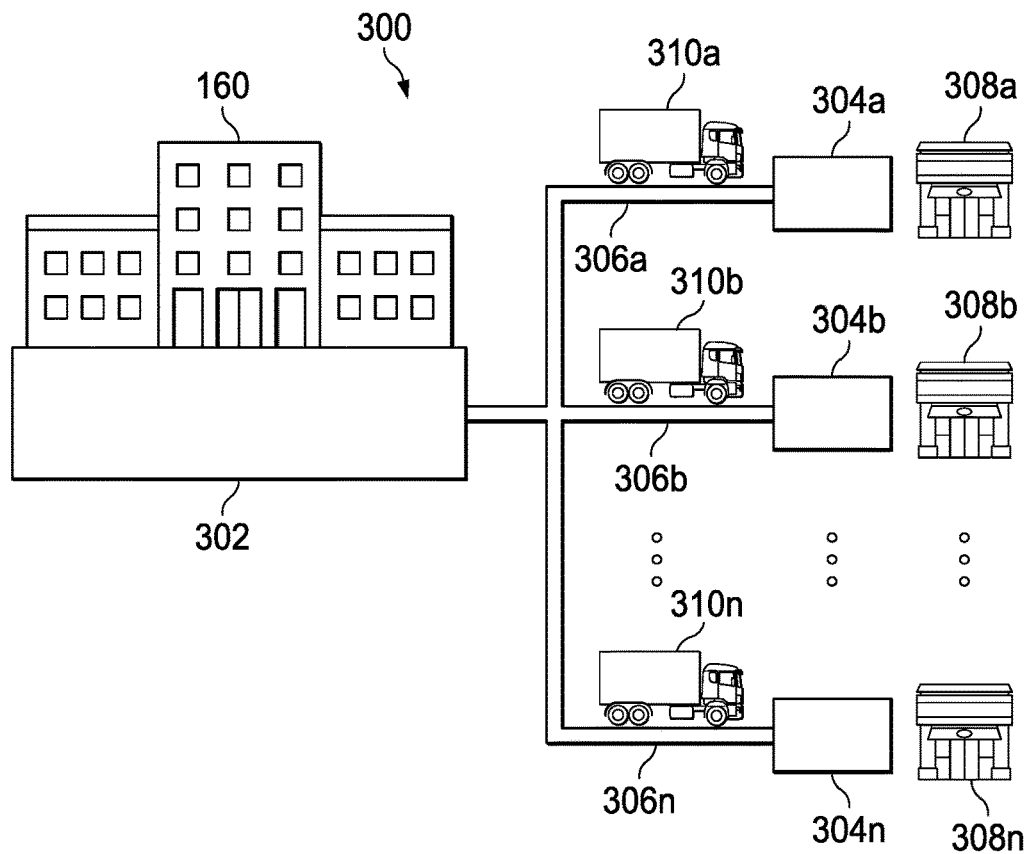
FIG. 3 illustrates a multi-echelon supply chain network, in accordance with an embodiment.

FIG. 3 illustrates multi-echelon supply chain network 300, in accordance with an embodiment. Multi-echelon supply chain network 300 comprises first echelon level node 302 and second echelon level nodes 304a-304n. Multi-echelon supply chain network 300 comprises a single distribution center 160 at first echelon level node 302, one or more stores 308a-308n of one or more retailers 150 at second echelon level nodes 304a-304n, and one or more transportation vehicles 310a-310n coupling first echelon level node 302 with second echelon level nodes 304a-304n along edges 306a-306n, in accordance with an embodiment. According to an embodiment, allocation module 202 may model the flow of items among one or more stores 308a-308n of one or more retailers 150, one or more distribution centers 160, and any other one or more supply chain entities 170 of supply chain network 100 using storage and/or transition units modelled as nodes 302 and 304a-304n, which represent a buffer for an item. Edges 306a-306n are modeled to represent the flow, transportation, or assembly of items between nodes 302 and 304a-304n by, for example, production processing or transportation. Flow-balance constraints for most, if not every node 302 and 304a-304n, constrain the item movement in supply chain network 100. Although multi-echelon supply chain network 300 is shown and described as comprising two echelons, a single distribution center 180, one or more stores 308a-308n of one or more retailers 150, and one or more transportation vehicles 310a-310n, multi-echelon supply chain network 300 may comprise any number of echelons, distribution centers, transportation vehicles, stores, and retailers, according to particular needs. In addition, or as an alternative, nodes 302 and 304a-304c of multi-echelon supply chain network 300 represent any one or more supply chain entities, such as, for example, stores 308a-308n, one or more retailers 150, one or more distribution centers 160, or other one or more supply chain entities 170 (including, but not limited to, one or more manufacturers, one or more suppliers, one or more customers, and/or the like).

Figure 4:
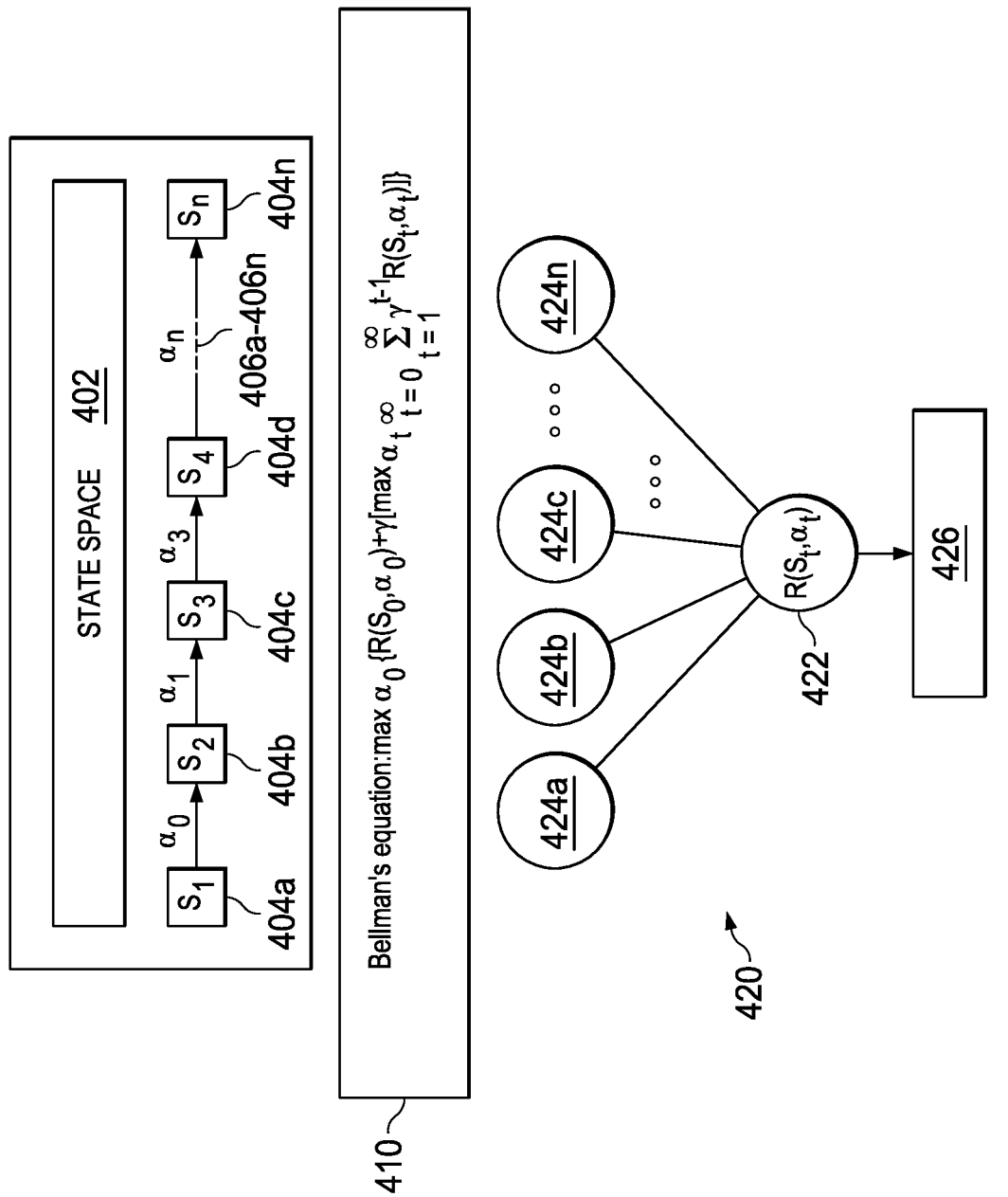
FIG. 4 illustrates modeling allocation of short life-cycle products as a semi-Markov Decision Process, (SMDP), in accordance with an embodiment.

FIG. 4 illustrates modeling allocation of short life-cycle products as an SMDP, in accordance with an embodiment. An SMDP comprises state space 402 having a finite set of states ($S_1, S_2, S_3, S_i \ldots S_n$) 404a-404n and a finite set of actions ($a_0, a_1, a_2, a_3 \ldots a_n$) 406a-406n. For allocation of short life-cycle products, states 404a-404n are an amount of stock of a product at a particular time for one or more inventory locations. Transitions between states 404a-404n occur when a demand leads to a sale and inventory increases by receipt of allocated products. Reward-penalty function 236 modeled as an SMDP comprises a reward for taking an action between each of states 404a-404n represented by Bellman's equation 410. Referring to model 420, Bellman's equation 410 gives the maximum profit (or minimum penalty) 426 that can be made at the current action as a sum of the maximum reward or penalty for a current state 422 and the cumulative weighted sum of the maximum reward or penalty for all previous states 424a-424n.

Each of the one or more states represent the state of the inventory at different time points in the allocation cycle. The initial state, $S_1$, represents the initial on-hand inventory. For each state of a historical allocation, allocation planner 110 determines whether the inventory was too great, or too little, based on the value of the reward or penalty calculated for that allocation. For each transition between states 404a-404n, reward-penalty function 236 determines the profit or loss generated by actions 404a-404n (e.g. allocating a particular quantity of inventory to a particular store). Allocation planner 110 enumerates historical data 252 to determine which action gives the maximum profit, using the profit function of Equation 2, below. Allocation planner 110 determines a particular allocation quantity from the current state, calculates the on-hand inventory for the next allocation, determines an allocation quantity at the next states, and continues to proceed with this calculation for the allocation horizon. By way of further explanation only and not by way of limitation, an example is given for an allocation horizon comprising six states. In this example, allocation planner 110 evaluates the six states and calculates the allocations to inventory that represent the five actions between each of the six states. Allocation planner 110 calculates the reward (or penalty) for each action at each state in the supply chain history to determine the amount of an allocation that would have maximized the profit given a particular state of the inventory for the product. Although the example is described for an allocation comprising six states and five actions, embodiments contemplate calculating a reward or penalty for any number of actions between any number of states, according to particular needs.

According to Bellman equation 410, the reward or penalty may be calculated as the expected profit or loss for a given action according to Equation 1:

$$\text{Reward}|\text{action}=\text{Expected}(\text{Profit or loss}) \quad (1)$$

which when written in terms of the following three cost factors:
(A) Product Margin, $E(N_{ij}^t)*(m_{ij}^t)$;
(B) Inventory Carrying Cost, $H_{ij}*inv_{ij}^t$; and
(C) Opportunity cost, $E(O_{ij}^t)*(OC_{ij}^t)$; becomes Equation 2:

$$\text{Max}\{E(\text{Profit}_{ij}|\text{action}_{ij}^t)\}=(E(N_{ij}^t)*m_{ij}^t-H_{ij}*inv_{ij}^t-E(O_{ij}^t)*(OC_{ij}^t)) \quad (2)$$

wherein:
i=index to represent product i
j=index to represent location j
t=index to represent unit time t
l=number of locations where the product is available
$m_{ij}^t$=unit margin of the product i available at location j at time t
$m_{ij}^t = SP_{ij}^t - cost_{ij}$
$SP_{ij}^t$=Selling Price of the product i at location j at time t
$cost_{ij}$=cost of unit product i at location j
$E(N_{ij}^t)$=Expected Number of units sold for product i at location j at time t
$H_{ij}$=Holding cost for product i at location j per unit time
$inv_{ij}^t$=average inventory for product j at location i at time t
$E(O_{ij}^t)$=Expected lost sales units of product i at location j at time t
$OC_{ij}^t$=Opportunity cost for lost sales per item for product i at location j at time t
$action_{ij}^t$=amount of stock sent to location j at given time t for product i
$Supply_i^{DC,t}$=Supply available at one or more distribution centers for product i
Presentation $Quantity_{ij}^t$=minimum quantity required from the store j for product i at time t.

Whenever an action is taken, allocation planner 110 calculates the maximum profit for the action as the product margin minus the inventory carry cost and the opportunity cost, as described in further detail below. When the maximum profit is positive, the profit is termed a reward. When the maximum profit is negative, this represents a loss, which is referred to as a penalty. For example, when allocation planner 110 holds too much inventory, the inventory carrying costs will increase, but, when allocation planner 110 holds too little inventory, sales of the product will be lost, and the opportunity costs will increase. Accordingly, allocation planner 110 calculates the maximum profit that can be made by keeping the inventory as low as possible while still selling the maximum quantity of products. When the inventory carrying costs or the opportunity costs increase more than the product margin, the reward will become a penalty (i.e. negative value for the reward). Therefore, allocation planner 110 determines an optimal allocation quantity that balances having enough of the product to meet as many sales as possible, while not holding too much of the product in inventory. In addition, or as an alternative, allocation planner 110 discounts the reward or penalty of a previous allocation when calculating the reward or penalty for a subsequent allocation by using, for example, exponential smoothing. Exponential smoothing may comprise a user-modified weightage, which is represented by γ in Bellman's equation 410. For example, in one embodiment, the effect of seasonality on a reward or penalty is smoothed across different allocations by modifying γ, which is selected based, at least in part, on the variability in the seasonality of the data.

As disclosed above by Equation 1, training module 204 calculates a reward or penalty as a product margin minus the inventory carrying cost and the opportunity cost. For product, i, at a location, j, at a particular time, t, the reward or penalty is the product margin (which training module 204 calculates as the expected number of units sold $E(N_{ij}^t)$ multiplied by the unit margin $m_{ij}^t$ for the product at the location) minus the inventory carrying cost (which training module 204 calculates as the holding cost $H_{ij}$ multiplied by the average inventory quantity $inv_{ij}^t$ for the product at the location) and the opportunity cost (which training module 204 calculates as the expected lost sales units $E(O_{ij}^t)$ multiplied by the per unit lost sales cost $OC_{ij}^t$ for the product at the location). By way of further explanation only and not by way of limitation, an example of a reward or penalty calculation is described for a short life-cycle product comprising a fashion retail shirt, which is sold at an allocation location, Store 1, at a time six weeks ago. In this example, training module 204 calculates from historical data 252 the expected number of units sold as thirty units, the per unit margin as twenty dollars, the holding cost as three dollars, the average inventory quantity as two-hundred units, the expected lost sales units as fifty units, and the per unit lost sales cost as twenty dollars.

According to one embodiment, all historical allocation quantities are assessed, whether optimal or not (i.e. regardless of whether an alternate allocation would have resulted in a greater reward). In addition, or in the alternative, when the historical allocation is not optimal (i.e. the allocation does not provide the maximum reward), allocation planner 110 assigns an alternate allocation and calculates the updated reward. Allocation planner 110 models all of the historical optimal rewards as a function of independent parameters. To determine future allocations, allocation planner 110 calculates independent variables 234 (such as, for example, mean, standard deviation, trend, allocation quantity, and the like, as described in further detail below) to determine an optimal allocation quantity, wherein the optimal allocation quantity is the allocation quantity that maximizes the reward. According to embodiments, allocation planner 110 uses a regression model, as described in further detail below, which directly estimates the optimal allocation and/or need quantity without calculating individual cost components of the reward-penalty function 236.

In this example, training module 204 calculates the reward or penalty for this allocation using the reward-penalty function 236 having three components (30*$20–200*$3–50*$20=600–600–1000=–$1000) and classifies the calculated value as a loss (i.e. a loss of one thousand dollars). In addition, training module 204 may model an allocation of a different quantity of units of the fashion retail shirts, wherein two-hundred units are allocated to Store 1 and the average inventory is thirty units. For this second example allocation, training module 204 calculates the reward or penalty for this allocation using the same reward-penalty function 236 having three components (200*$20–30*$3–50*$20=5000–90–1000=$2910), and classifies the calculated value as a profit of two-thousand nine-hundred and ten dollars. Continuing with this example, training module 204 of allocation planner 110 may continue to calculate rewards or penalties for various what-if scenarios 238 for different allocations of the fashion retail shirt to identify what would have been the optimal allocation six weeks ago at Store 1. Although this simplified example describes calculating the optimal allocation based on the reward or profit for a single store, in a typical real-world case, training module 204 would calculate the optimal reward or penalty for a grouping of one or more stores 308a-308n (such as, for example, a cluster of one or more stores), wherein each of one or more stores 308a-308n receives a portion of a total supply from one or more distribution centers 160.

Figure 5:
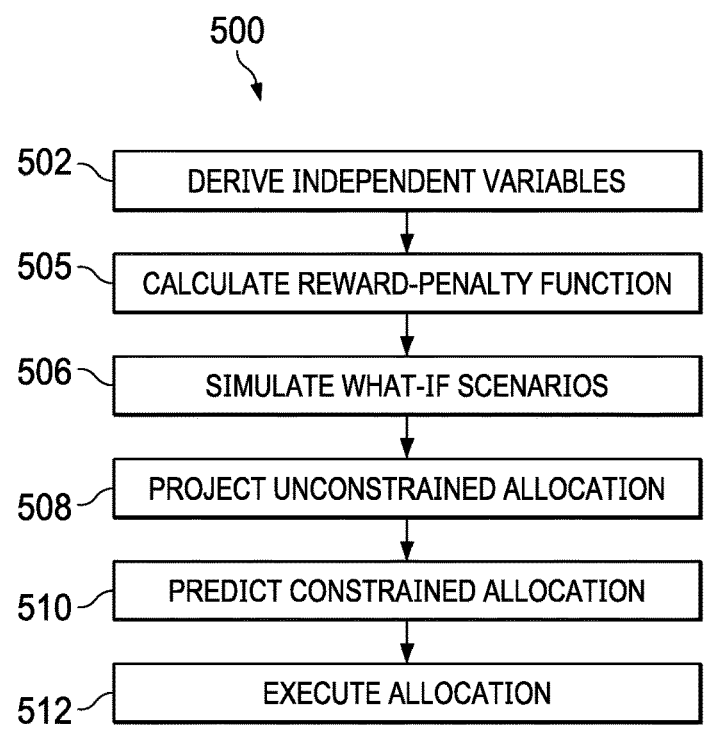
FIG. 5 illustrates allocation planning method, in accordance with an embodiment.

FIG. 5 illustrates allocation planning method 500, in accordance with an embodiment. Allocation planning method 500 comprises one or more activities, which although described in a particular order may be implemented in one or more permutations, according to particular needs. Although particular activities are described as being performed by allocation planner 110, embodiments contemplate performing any one or more activities of the method of allocation planning by allocation planner 110 (or one of its modules), archiving system 120, one or more planning and execution systems 130a-130n, one or more retailers 150, one or more distribution centers 160, one or more other supply chain entities 170, and/or one or more computers 180, according to particular needs. Method 500 begins at activity 502 by allocation planner 110 deriving independent variables 234 from historical data 252. According to embodiments, allocation planner 110 derives independent variables 234 by regression analysis of data collected from archiving system 120, one or more planning and execution systems 130a-130n, one or more networked imaging devices 140, one or more retailers 150, one or more distribution centers 160, and/or one or more other supply chain entities 170. In one embodiment, independent variables 234 are derived by allocation planner 110 using a correlation analysis and comprise, for example, mean (average) sales of the previous few weeks, standard deviation of sales, sent receipts, lags of demand, seasonal factor, location cluster, product attributes, and price. Although independent variables 234 are described as mean (average) allocation of the previous few weeks, standard deviation, sent receipts, lags of demand, seasonal factor, location cluster, and price, embodiments contemplate deriving other suitable independent variables 234, according to particular needs.

At activity 504, allocation planner 110 calculates reward-penalty function 236 using historical values of independent variables 234. For calculating reward-penalty function 236, allocation planner 110 models reward-penalty function 236 as a dependent variable of independent variables 234. As disclosed above, allocation planner 110 calculates reward-penalty function 236 using Bellman equation 410 to calculate a maximum reward (or minimum penalty) for reinforcement learning where the calculated reward or penalty is the amount of profit or loss generated by an allocation or a sale of stock, as disclosed above. According to embodiments, the cost components are not individually estimated. By way of example only and not by way of limitation, a reward or penalty is estimated as a model of independent variables using any suitable regression model. In one embodiment, the regression model is a multiple linear regression model. Embodiments contemplate any suitable regression model, such as, for example, random forest regressor, support vector regressor, and/or the like.

As disclosed above, historical data 252 may be any supply chain data, causal factors, clustering (stores 308a-308n, customer, products, and the like). Allocation planner 110 retrieves historical data 252 for each of the derived independent variables 234 to calculate the reward or penalty of allocations taken in historical data 252. For example, if allocation planner 110 allocated ten units of an item during a particular allocation, allocation planner 110 calculates the profit or loss for the ten units to identify the reward or penalty associated with this allocation. When the allocation resulted in loss, allocation planner 110 classifies the loss as a penalty for allocating too little or too much quantity of the product. When the allocation resulted in profit, allocation planner 110 classifies the profit as a reward for allocating a sufficient (but not excess) quantity of the product.

At activity 506, allocation planner 110 simulates what-if scenarios 238 for previous allocations to identify the optimal allocation. By modeling reward-penalty function 236, allocation planner 110 simulates what-if scenarios 238 for each action taken in the past to identify the correct decision (allocating and sending the correct quantity of inventory to a store). Each of the simulated what-if scenarios 238 are selected based on the distance to one or more selected or identified independent features of the current allocation. According to an embodiment, allocation planner 110 identifies similar historical what-if scenarios 238 by searching within the same product category as the product of the current allocation problem. In one embodiment, the SMDP models reward-penalty function 236 as a nonlinear combination of independent variables 234 by estimating the statistics (such as, for example, market trends data 232).

Continuing with the example of activity 504, if one or more distribution centers 160 has one-hundred units of a short life-cycle product, and ten units were allocated in the past, allocation planner 110 calculates reward-penalty function 236 for the ten units, as disclosed above. Allocation planner 110 generates what-if scenarios 238 and calculates the profit or loss using reward-penalty function 236 for other allocation quantities (such as, for example, twenty units, thirty units, forty units, and the like) until allocation planner 110 determines the optimal position to have taken at the previous allocation. In addition, or as an alternative, allocation planner 110 uses one or more KPIs (such as, for example, service level, lateness, and the like) to determine optimal allocations. For example, allocation planner 110 may calculate the optimal allocation by simulating what-if scenarios 238 using the historical values of the KPIs when calculating the value of the reward-penalty function 236.

At activity 508, prediction module 206 of allocation planner 110 calculates the unconstrained allocation quantity, and, at activity 510, prediction module 206 calculates the constrained allocation quantity. As disclosed above, the product need quantity comprises an unconstrained allocation quantity and the optimal allocation quantity comprises a constrained allocation quantity. In addition, prediction module 206 may calculate only a constrained allocation quantity, only an unconstrained allocation quantity, or both a constrained and unconstrained allocation quantity for a particular allocation, as described in further detail below.

At activity 512, allocation planner 110 executes allocation of short-cycle product to one or more allocation locations. In one embodiment, allocation module 202 of allocation planner 110 compares the product need quantity and the optimal allocation quantity to initiate an action to remove the one or more constraints at one more distribution centers 160 or stores 308a-308n of one more retailers 150. For example, allocation planner 110 may select one or more alternate or additional vendors to supply the difference between the product need quantity and the optimal allocation quantity to an allocation location. By using the constrained and unconstrained allocation quantities, allocation planner 110 generates insights and provides a mechanism to override the allocation amount and supply more stock of the short life-cycle product. By way of example only and not by way of limitation, allocation planner 110 provides insight and a mechanism to determine whether increasing supply over the product need at one or more distribution centers 160 might generate greater profit and identify which constraints are preventing a higher supply from being allocated. Continuing with this example, if the unconstrained allocation quantity is one-hundred-and-twenty units, but the constrained allocation quantity for one or more distribution centers 160 is only one-hundred units, then allocation planner 110 may identify an alternate vendor or redistribute supply to allow the fully unconstrained allocation quantity to be met. In addition, or as an alternative, allocation planner 110 calculates a pre-season buy need by calculating constrained and/or unconstrained allocation quantities for an entire allocation horizon to determine a total pre-season buy need or identify a particular increase or decrease of a buy quantity for one or more stores 308a-308n.

In addition, allocation planner 110 models both constrained and unconstrained allocation planning problems. Constrained allocation planning problems may comprise constraints, such as, for example, the presentation quantity constraint and the distribution center stock level constraint, which are examined in the use cases below. By way of explanation only and not by way of limitation, the following four use cases (Case 1-Case 4) describe examples of constrained or unconstrained supply at one or more distribution centers 160 and constrained or unconstrained minimum presentation quantities at stores 308a-308n of one or more retailers 150. In addition, although the examples below are discussed as determining the reward or the allocation quantity at the product-level, in many real-world cases product-level data is not available. Instead, the reward or the allocation quantity is determined at the category-level. However, when one or more retailers 150 collect data at the item-level or SKU-level, allocation planner 110 may, additionally or as an alternative, calculate the maximum potential item quantity using the item- or SKU-level, according to the equations disclosed below.

The following four use cases indicate the presence or absence of constraints at the first and the second echelon of multi-echelon supply chain network 300, when planning an allocation planning problem as summarized in TABLE 1:

Case 1: Unconstrained Nodes

In a first case, Case 1, all nodes 302 and 304a-304n of multi-echelon supply chain network 300 are presumed to be unconstrained in multi-echelon supply chain 300, as described in FIG. 3, above. In this example, allocation planner 110 calculates reward-penalty function 236 assuming that there is an unlimited supply of the product at one more distribution centers 160 and that none of stores 308a-308n of one more retailers 150 are requesting a minimum presentation quantity for the product. By calculating the reward or penalty with no constraints on one more distribution centers 160 and stores 308a-308n of one more retailers 150, the sole objective of allocation planner 110 is to maximize expected rewards. In this case, allocation planner 110 calculates the optimal solution of a store allocation without taking into consideration the inventory and demand rate positions at remaining stores maximizing the profit at a store level. Allocation planner 110 calculates the maximum profit for an action in Case 1 with reward-penalty function 236 as described above in connection with Equation 2, without any additional constraints. The result gives the maximum potential sale at store with unconstrained supply and unconstrained need at the store.

Case 2: Constrained Supply at Distribution Center

In a second case, allocation planner 110 calculates the reward or penalty for one more distribution centers 160 having a constraint (such as, for example, a limited supply of the product available at one more distribution centers

TABLE 1

| Constrained Supply at DC? | Presentation Quantity Constraint at Store? | Use Case |
|---|---|---|
| No | No | Case 1: The reward-penalty function is calculated, as described above in connection with Equation 2, without any additional constraints. The result gives the maximum potential sale at store with unconstrained supply and unconstrained need at store. |
| Yes | No | Case 2: One more distribution centers 160 does not have enough supply to fulfill all orders at all stores 308a-308n. The reward-penalty function is calculated with the following constraint:<br><br>$$\sum_{i=1}^{I} \text{action}_{ij}^{t} < \text{Supply}_{j}^{DC}$$<br><br>The result gives the recommended allocation quantity at a store when supply at one more distribution centers 160 is constrained but there is no minimum presentation quantity at stores 308a-308n. |
| No | Yes | Case 3: Recommend Allocation quantity at store having presentation quantity constraint. The reward-penalty function is calculated with the following constraint:<br>$\text{action}_i^t \geq \text{Presentation Quantity}_i$<br>The result gives the reward-penalty only for actions which result in a minimum presentation quantity being allocated to stores 308a-308n. |
| Yes | Yes | Case 4: A constrained supply at one more distribution centers 160 as well as a minimum presentation quantity at stores 308a-308n. The reward-penalty function is calculated with the following constraints:<br><br>$$\sum_{j=1}^{I} \text{action}_{ij}^{t} \leq \text{Supply}_{i}^{DC,t}$$<br><br>$\text{action}_{ij}^{t} \geq \text{Presentation Quantity}_{ij}^{t}$<br><br>The result is the actual allocation quantity for most real-world scenarios, where both one more distribution centers 160 and stores 308a-308n of one more retailers 150 have constraints. |

160), but stores 308a-308n of one more retailers 150 are unconstrained. When allocation planner 110 calculates the reward-penalty for constrained distribution centers 160, the output is the global solution maximizing the profit at the level of one more distribution centers 160. The global solution maximizing the profit at the level of one more distribution centers 160 is given by solving Equation 2, subject to the following constraint:

$$\sum_{i=1}^{l} \text{action}_{ij}^{t} < \text{Supply}_{j}^{DC}$$

In this case, allocation planner 110 considers only those actions where the sum of all actions at all of the allocated stores 308a-308n is less than the supply at one more distribution centers 160. By way of example only and not by way of limitation, allocation planner 110 calculates a what-if scenario for a product allocation of ten units to Store 1, fifteen units to Store 2, and twenty units to Store 3. Continuing with this example, when the supply at one more distribution centers 160 is forty units, allocation planner 110 does not consider this what-if scenario when determining the proper allocation to the current stores 308a-308n because the allocation would be greater than the available supply (i.e. 10+15+20=45, which is greater than the available supply of forty units at one more distribution centers 160). However, when the supply at one more distribution centers 160 is fifty units, allocation planner 110 would consider the what-if scenario comprising the ten units to Store 1, fifteen units to Store 2, and twenty units to Store 3.

Case 3: Constrained Presentation Quantity at Stores

As disclosed above, one or more retailers 150 may keep a presentation quantity of one or more items to use for displaying the product at one or more stores 308a-308n. In this case, Case 3, the presentation quantity comprises the constrained minimum amount of stock that is allocated to one or more stores 308a-308n. In this example, which may be, for example, a launch of a new product, one more distribution centers 160 will likely have an excess of stock, such that the supply at one more distribution centers 160 is unconstrained. However, one or more retailers 150 may still require a minimum presentation quantity to be available at each of stores 308a-308n. Accordingly, in this situation, whenever allocation planner 110 takes an action, the action must meet the minimum presentation quantity for stores 308a-308n, as represented by the following constraint:

$$\text{action}_i^t \geq \text{Presentation Quantity}_j$$

For example, when the presentation quantity is fifty units, allocation planner 110 disregards what-if scenarios 238 based on historical allocations where the allocation quantity is less than fifty units (such as, for example, fifteen units, twenty units, thirty units, forty units, and the like). Instead, when the minimum presentation quantity is fifty units, allocation planner 110 calculates reward-penalty function 236 for what-if scenarios 238 based on historical allocations that are greater than fifty units.

Case 4: Constrained Presentation Quantity at Stores and Constrained Supply at Distribution Center In Case 4, the allocation quantity must respect a limited supply at one more distribution centers 160 as well as a minimum presentation quantity at stores 308a-308n of one or more retailers 150. Unlike the exemplary product launch situation of Case 3, most real-world situations will comprise constraints for both the supply at one more distribution centers 160 as well as the presentation quantity at stores 308a-308n. The minimum presentation quantity at one or more stores 308a-308n and limited supply available at one more distribution centers 160 are represented by the following constraints:

$$\sum_{j=1}^{l} \text{action}_{ij}^{t} \leq \text{Supply}_{i}^{DC,t} \; \forall \, i$$

$$\text{action}_{ij}^{t} \geq \text{Presentation Quantity}_{ij}^{t} \; \forall \, i$$

In this example, the optimal quantity is calculated between, on one end, a minimization problem bounded by the minimum presentation quantity, and, on the other end, by a maximization problem bounded by the maximum supply at one more distribution centers 160. In this example, allocation planner 110 receives supply level for one more distribution centers 160 for a particular product as an input, and tries to satisfy one more distribution centers 160 stock level constraint. Although there is no global optimal for the solution, allocation planner 110 may recalculate the solution each time new data or a new historical data 252 is generated. For the above example, the optimal solution for a particular allocation may be calculated for profit maximization. The solution represents the actual allocation quantity for most real-world scenarios, where both one more distribution centers 160 and stores 308a-308n of one or more retailers 150 have constraints.

Figure 6:
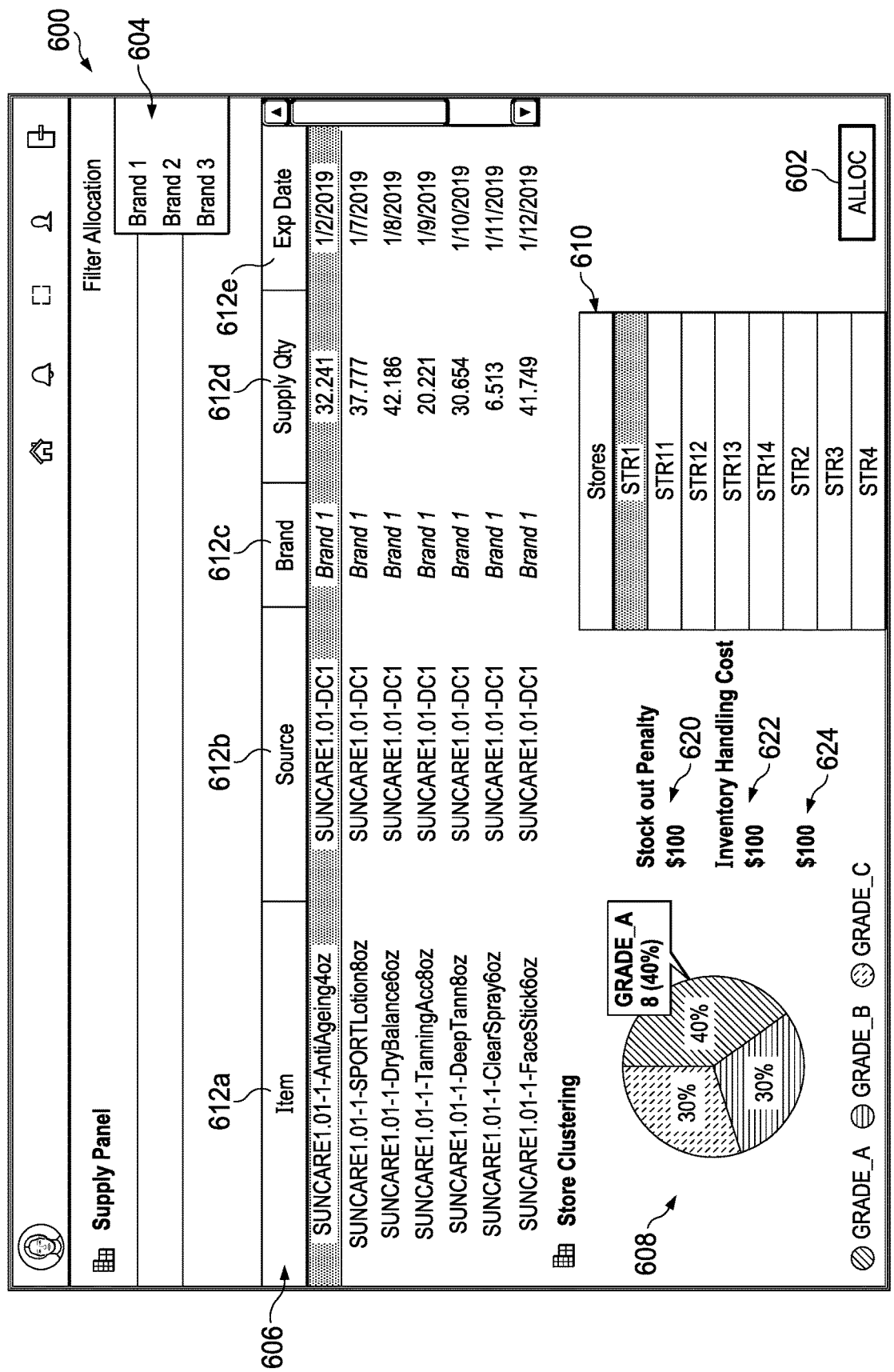
FIG. 6 illustrates a dashboard, in accordance with an embodiment.

FIG. 6 illustrates dashboard 600, in accordance with an embodiment. User interface module 208 of allocation planner 110 generates dashboard 600 comprising reinforcement learning execution button 602, filter 604, product list 606, clustering chart 608, and store list 612.

According to embodiments, reinforcement learning execution button 602 generates constrained and/or unconstrained allocation quantities for a selected product at one or more allocation locations using reinforcement learning, as disclosed above. By way of example only and not by way of limitation, allocation planner 110 calculates an allocation for one or more sunscreen lotion products for a particular brand, Brand 1, by input of the brand name into filter 604. Product list 606 comprises identifier 612a (e.g. a product name), source 612b (e.g. a distribution center or other stocking location), brand 612c, supply quantity 612d, and expiration date 612e for supply of a particular product at each of the supply locations, which in the current example, comprises the sunscreen of Brand 1 input into filter 604. In response to selection of an from product list 606, such as, for example, first item (Anti-Aging 4 oz.), user interface module 208 updates dashboard 600 to display the store clustering chart 608 and store list 610 associated with the selected item. Although product list 606 is illustrated as comprising item 612a, source 612b, brand 612c, supply quantity 612d, and expiration date 612e for the sunscreen of Brand 1, embodiments contemplate product list 606 displaying any suitable information for any allocated item, according to particular needs. Clustering chart 608 comprises a visualization of one or more clusters used for allocation of one or more selected products of product list 606. In one embodiment, clustering chart 608 comprises a pie chart showing percentages and number of stores from store list 610 assigned to each of the clusters (GRADE_A, GRADE_B, and GRADE_C), which follow classic Pareto rules to differentiate priorities of a set of stores. According to one embodiment, each of the clusters are classified based on sales, revenue, and the like.

Although clustering chart 608 is described as comprising a pie chart showing store clustering, embodiments contemplate user interface module 208 generating dashboard 600 comprising any one or more visualizations providing for the selection and modification of any one or more clusters, such as, for example, machine learning-based product, customer, channel, or store clusters, according to particular needs. In addition, or as an alternative, dashboard 600 displays stock out penalty value 620, inventory handling cost value 622, and margin value 624. In response to selection of one or more products from product list 606, user interface module 208 updates dashboard 600 to display the calculated or user-selected stock out penalty value 620, inventory handling cost value 622, and margin value 624. In addition, or as an alternative, dashboard 600 displays input values of stock out penalties and inventory costs of each store cluster, which may include a different between a stock out penalty and inventory cost for a first cluster (e.g. GRADE_A) and a second and third cluster (e.g. GRADE_B and GRADE_C).

In addition, or as an alternative, margin value 624 varies for the different store clusters. In one embodiment, dashboard 600 does not display margin value 624 when the value is not the same for each cluster. Embodiments contemplate displaying any number of one or more margin values 624 for each of the store clusters, such as, for example, in one or more columns or in a popup associated with store clustering chart 608.

After selection of a product from product list 606 and in response to selection of reinforcement learning execution button 602, allocation planner 110 executes the reinforcement learning model for the selected product, calculates a constrained and unconstrained allocation quantity for the selected product, and generates an allocation map showing the allocations of the selected production from source 612b to each of stores 308a-308n in stores list 610.

Figure 7:
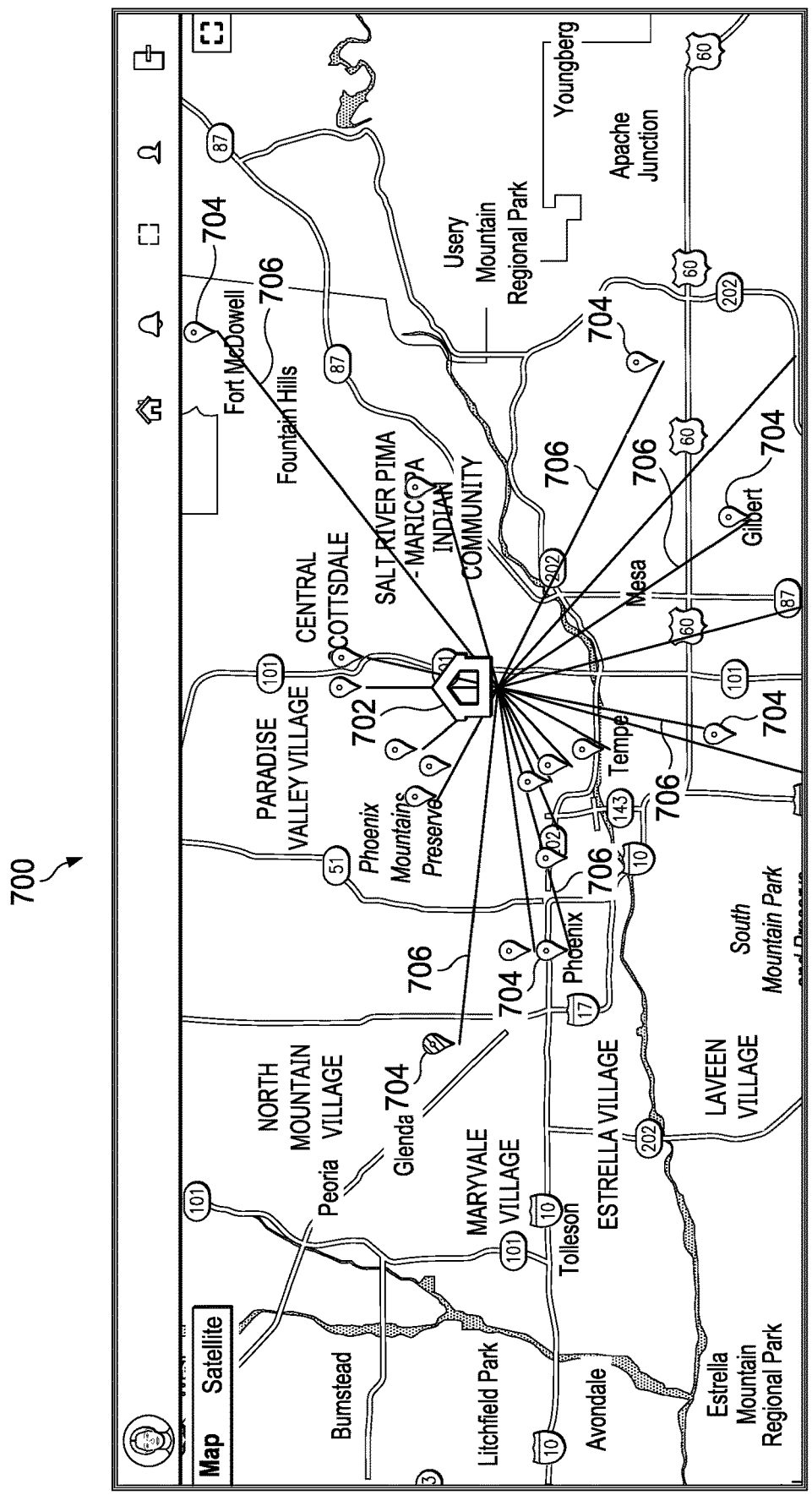
FIG. 7 illustrates an allocation map, in accordance with an embodiment.

FIG. 7 illustrates allocation map 700, in accordance with an embodiment. Allocation map 700 comprises sourcing location 702, allocation locations 704, and connectors 706. In one embodiment, user interface module 208 updates dashboard 600 to display allocation map 700 comprising sourcing location 702, allocation locations 704, and connectors 706 that represent allocation of a product selected from list 606 from source 612b to stores 308a-308n of store list 610. In one embodiment, sourcing location 702 comprises one or more distribution centers 160 of source 612b and allocation locations 704 comprise one or more stores 308a-308n of store list 610, as disclosed above. Connectors 706 connect a sourcing location 702 to one or more allocation locations 704. In one embodiment, connectors 706 indicate the movement or transportation of goods from sourcing location 702 to allocation locations 704. Although map 700 is shown and described as comprising a single sourcing location 702 representing one or more distribution centers 160 of source 612b, one or more allocation locations 704 representing one or more stores 308a-308n of store list 610, and one or more connectors 706 coupling a single sourcing location 702 to one or more allocation locations 704, embodiments contemplate any number of sourcing locations 702 and any number of allocation locations 704 comprising one or more item storage buffers or nodes at one or more retailers 150, one or more distribution centers 160, or one or more other supply chain entities 170, which are coupled by any number of connectors 706, according to particular needs.

Figure 8:
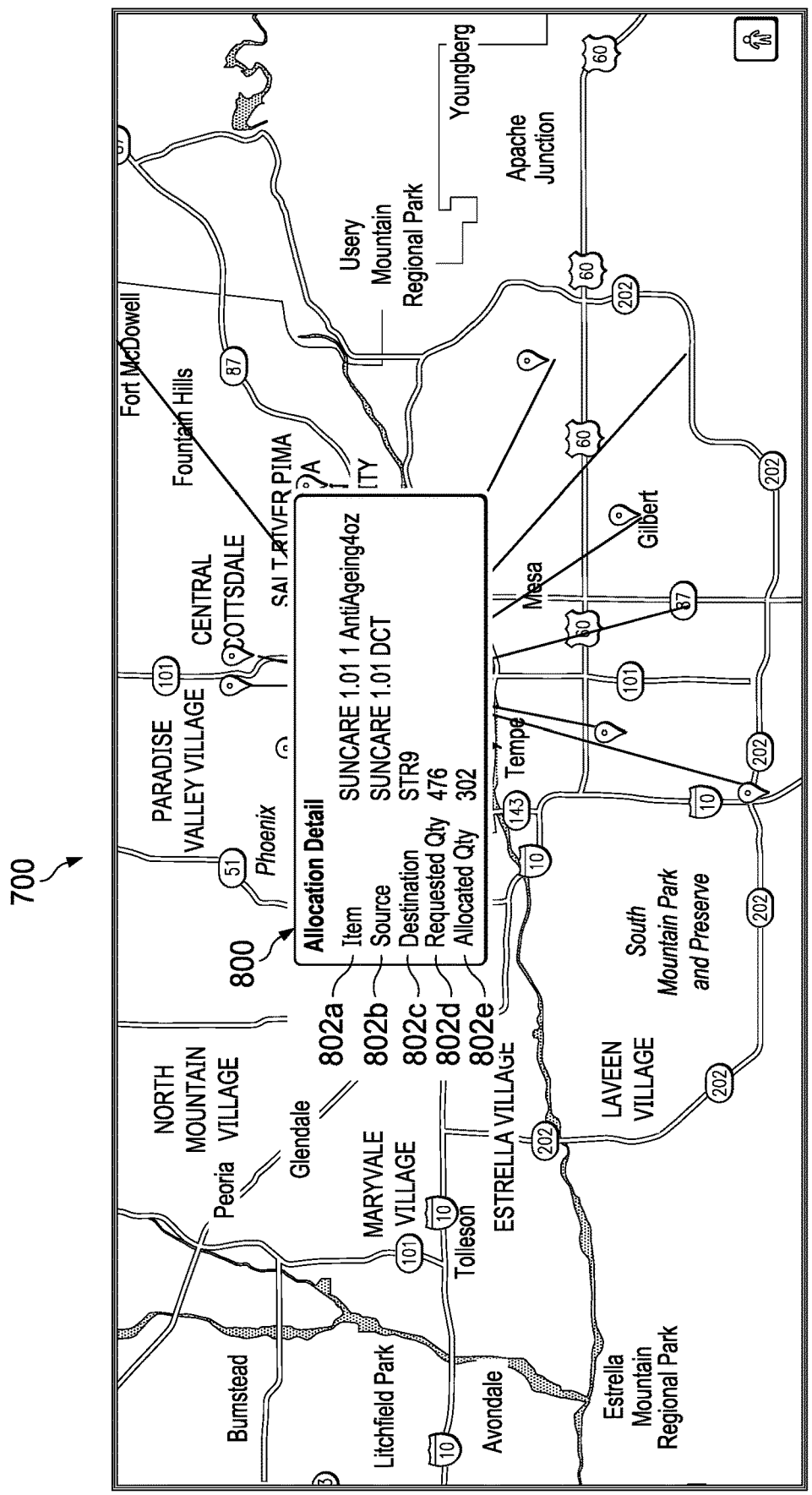
FIG. 8 illustrates the allocation map of FIG. 7, in accordance with a further embodiment.

FIG. 8 illustrates allocation map 700 of FIG. 7, in accordance with a further embodiment. In response to selection of a connector of one or more connectors 706, user interface module 208 updates display of allocation map 700 to display allocation detail popup 800, according to an embodiment. Allocation detail popup 800 displays details of the allocation from sourcing location 702 to the allocation location of the one or more allocation locations 704 represented by the selected connector of one or more connectors 706. According to an embodiment, allocation detail popup 800 displays name 802a of selected and allocated item from product list 606, name 802b of source 612b of sourcing location 702, name 802c of store of allocation location 704 from store list 610, requested quantity 802d (unconstrained allocation calculation), and allocated quantity 802e (constrained allocation quantity) calculated by allocation planner 110 in response to selection of reinforcement learning execution button 602, as disclosed above. Although allocation detail popup is shown and described as comprising particular data for an allocated sunscreen item, embodiments contemplate allocation detail popup 800 displaying any suitable combination of calculated and stored values associated with allocation of one or more products, according to particular needs.

Figure 9:
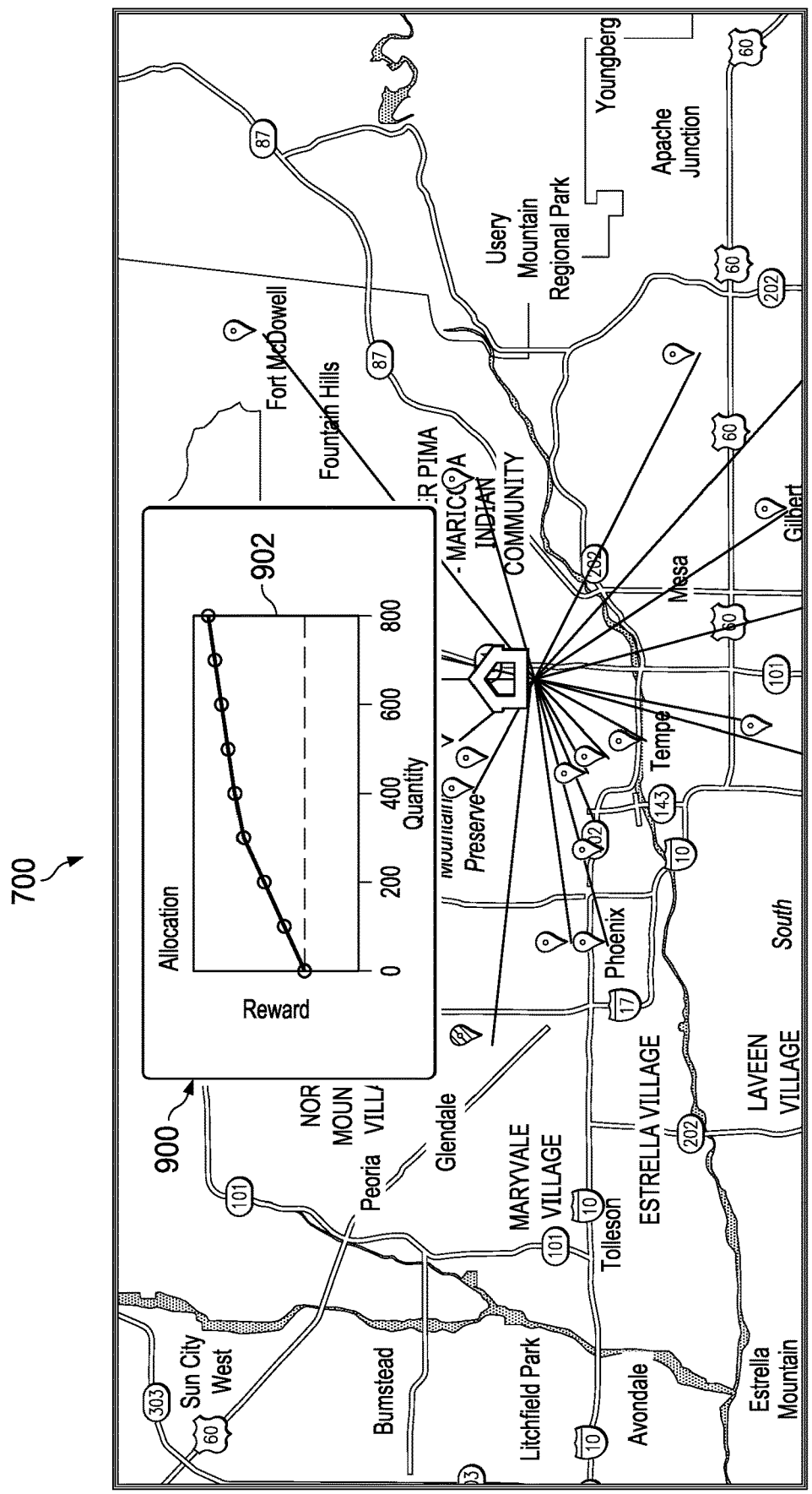
FIG. 9 illustrates the allocation map of FIG. 7, in accordance with a third embodiment.

FIG. 9 illustrates allocation map 700 of FIG. 7, in accordance with a third embodiment. In response to selection of an allocation location of one or more allocation locations 704, user interface module 208 updates map 700 to display analysis popup 900. According to an embodiment, analysis popup 900 comprises profit-quantity chart 902. Profit-quantity chart 902 comprises a need quantity (x-axis) and reward (y-axis), which are calculated according to the disclosure, above, and illustrates the calculated profit expected for various allocation quantities to the selected store of allocation location 704 including the optimal need quantity which achieve the maximum profit or reward.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A system of allocation planning, comprising:
   a network, automated warehousing equipment and a server, comprising a processor and memory, the server operably connected over the network to the automated warehousing equipment, the server further configured to:
   calculate, using a reward-penalty function as part of a reinforcement learning process, a reward for a historical allocation of a product to one or more stores associated with a retailer, wherein the reward-penalty function comprises product margin, inventory carrying cost and opportunity cost represented by Bellman's equation;
   simulate what-if scenarios for the historical allocation to identify an allocation having a greater reward than the historical allocation;
   allocate a quantity of a product for a current allocation to the one or more stores based, at least in part, on a distance calculation of one or more independent variables for the historical allocation and the current allocation and the identified allocation having the greater reward then the historical allocation; and responsive to a difference between a current inventory level and a constrained allocation quantity, retrieve a quantity of the product equal to the difference between the current inventory level and the constrained allocation quantity for transportation to stores by sending instructions over the network to the automated warehousing equipment of one or more distribution centers to automatically retrieve the quantity of the product.

2. The system of claim 1, wherein the server is further configured to:
calculate an unconstrained allocation quantity representing a product need at the one or more stores.

3. The system of claim 1, wherein the server is further configured to:
calculate a constrained allocation quantity representing an optimal allocation quantity.

4. The system of claim 3, wherein calculate a constrained allocation quantity representing an optimal allocation quantity comprises a minimum presentation quantity constraint for at least one of the one or more stores.

5. The system of claim 3, wherein calculate a constrained allocation quantity representing an optimal allocation quantity comprises a supply level constraint at one or more distribution centers and a minimum presentation quantity constraint for at least one of the one or more stores.

6. The system of claim 5, wherein the independent variables comprise one or more of:
sales average;
sales variability;
sent receipts;
lags of demand;
seasonal factors;
store clusters;
climate data; and
market trends.

7. A computer-implemented method of allocation planning, comprising:
networking a computer with automated warehousing equipment;
calculating, by the computer comprising a processor and memory, using a reward-penalty function as part of a reinforcement learning process, a reward for a historical allocation of a product to one or more stores associated with a retailer, wherein the reward-penalty function comprises product margin, inventory carrying cost and opportunity cost represented by Bellman's equation;
simulating, by the computer, what-if scenarios for the historical allocation to identify an allocation having a greater reward than the historical allocation;
allocating, by the computer, a quantity of a product for a current allocation to the one or more stores based, at least in part, on a distance calculation of one or more independent variables for the historical allocation and the current allocation and the identified allocation having the greater reward then the historical allocation; and
responsive to a difference between a current inventory level and a constrained allocation quantity, retrieve a quantity of the product equal to the difference between the current inventory level and the constrained allocation quantity for transportation to stores by sending instructions over the network to the automated warehousing equipment of one or more distribution centers to automatically retrieve the quantity of the product.

8. The computer-implemented method of claim 7, further comprising:
calculating, by the computer, an unconstrained allocation quantity representing a product need at the one or more stores.

9. The computer-implemented method of claim 7, further comprising:
calculating, by the computer, a constrained allocation quantity representing an optimal allocation quantity.

10. The computer-implemented method of claim 9, wherein calculating a constrained allocation quantity representing an optimal allocation quantity comprises a minimum presentation quantity constraint for at least one of the one or more stores.

11. The computer-implemented method of claim 9, wherein calculating a constrained allocation quantity representing an optimal allocation quantity comprises a supply level constraint at one or more distribution centers and a minimum presentation quantity constraint for at least one of the one or more stores.

12. The computer-implemented method of claim 11, wherein the independent variables comprise one or more of:
sales average;
sales variability;
sent receipts;
lags of demand;
seasonal factors;
store clusters;
climate data; and
market trends.

13. A non-transitory computer-readable medium embodied with software, the software when executed:
networks a computer with automated warehousing equipment;
calculates, using a reward-penalty function as part of a reinforcement learning process, a reward for a historical allocation of a product to one or more stores associated with a retailer, wherein the reward-penalty function comprises product margin, inventory carrying cost and opportunity cost represented by Bellman's equation;
simulates what-if scenarios for the historical allocation to identify an allocation having a greater reward than the historical allocation;
allocates a quantity of a product for a current allocation to the one or more stores based, at least in part, on a distance calculation of one or more independent variables for the historical allocation and the current allocation and the identified allocation having the greater reward then the historical allocation; and
responsive to a difference between a current inventory level and a constrained allocation quantity, retrieves a quantity of the product equal to the difference between the current inventory level and the constrained allocation quantity for transportation to stores by sending instructions over the network to the automated warehousing equipment of one or more distribution centers to automatically retrieve the quantity of the product.

14. The non-transitory computer-readable medium of claim 13, the software when executed further:
calculates an unconstrained allocation quantity representing a product need at the one or more stores.

15. The non-transitory computer-readable medium of claim 13, the software when executed further:
calculates a constrained allocation quantity representing an optimal allocation quantity.

16. The non-transitory computer-readable medium of claim 15, wherein calculates a constrained allocation quantity representing an optimal allocation quantity comprises a minimum presentation quantity constraint for at least one of the one or more stores.

17. The non-transitory computer-readable medium of claim 15, wherein calculates a constrained allocation quantity representing an optimal allocation quantity comprises a supply level constraint at one or more distribution centers and a minimum presentation quantity constraint for at least one of the one or more stores.

* * * * *